(12) United States Patent
Fringant et al.

(10) Patent No.: US 8,324,322 B2
(45) Date of Patent: Dec. 4, 2012

(54) POLYMER COMPOSITION

(75) Inventors: Christophe Fringant, Peseux (FR);
Vincent Bodart, Namur (BE);
Berengere Rixens, Montpellier (FR);
Romain Severac, Moisson (FR); Yves Hervaud, Montpellier (FR); Patrick Lacroix-Desmazes, Montpellier (FR); Bernard Boutevin, Montpellier (FR)

(73) Assignee: Solvay (Societe Anonyme), Brussels (BE)

( * ) Notice: Subject to any disclaimer, the term of this patent is extended or adjusted under 35 U.S.C. 154(b) by 978 days.

(21) Appl. No.: 10/572,944

(22) PCT Filed: Sep. 22, 2004

(86) PCT No.: PCT/EP2004/052272
§ 371 (c)(1),
(2), (4) Date: Oct. 13, 2006

(87) PCT Pub. No.: WO2005/028557
PCT Pub. Date: Mar. 31, 2005

(65) Prior Publication Data
US 2007/0218207 A1    Sep. 20, 2007

(30) Foreign Application Priority Data

Sep. 23, 2003 (FR) .......... 03 11166
Mar. 25, 2004 (FR) .......... 04 03108

(51) Int. Cl.
*C08L 27/08* (2006.01)
*C08L 33/08* (2006.01)
*C08L 27/12* (2006.01)
*B05D 7/02* (2006.01)
*B05D 7/16* (2006.01)
*B05D 7/10* (2006.01)
*C08F 230/02* (2006.01)
*C08F 214/08* (2006.01)

(52) U.S. Cl. ............ 525/242; 427/407.1; 427/409; 427/411; 524/543; 524/544; 524/558; 524/568; 524/881; 525/538; 526/278; 526/343

(58) Field of Classification Search .......... 525/242, 525/416, 538; 427/331, 407.1, 409, 411; 524/543, 544, 558, 568, 881; 526/278, 343
See application file for complete search history.

(56) References Cited

U.S. PATENT DOCUMENTS 2,971,948 A * 2/1961 Denk et al. .......... 526/278
(Continued)

FOREIGN PATENT DOCUMENTS

DE        19 27 270        12/1970
(Continued)

OTHER PUBLICATIONS

U.S. Appl. No. 10/553,993, filed Oct. 20, 2005, Lacroix-Desmazes, et al.
(Continued)

*Primary Examiner* — Michael Pepitone
(74) *Attorney, Agent, or Firm* — Oblon, Spivak, McClelland, Maier & Neustadt, L.L.P.

(57) ABSTRACT

Polymer composition comprising: 1) a polymer (P1) comprising at least 50% by weight of monomeric units derived from an ethylenically unsaturated monomer (M1), and 2) at least one co-oligomer (O1) comprising at least: a) a component (A) comprising at least one monomeric unit identical to that derived from the monomer (M1) on which the polymer (P1) is based, and b) a component (B) comprising at least one monomeric unit (m2), derived from an ethylenically unsaturated monomer, carrying at least one group chosen from the following groups: $-C_aH_{2a+1}$ with a between 6 and 30; $-(CH_2)_b-C_cF_{2c+1}$ with b between 1 and 11 and c greater than or equal to 5; $-(CH_2)_d-(Si(CH_3)_2-O)_e-Si(CH_3)_3$ with d between 1 and 11 and e between 1 and 1000; $-COOH$; $-SO_3H$, and the phosphonate groups $-PO(OH)(OR_1)$ with $R_1$ being a hydrogen atom or an alkyl radical containing from 1 to 11 carbon atoms.

19 Claims, 4 Drawing Sheets

U.S. PATENT DOCUMENTS

| | | | |
|---|---|---|---|
| 3,108,017 A | 10/1963 | Messwarb et al. | |
| 3,476,587 A * | 11/1969 | Mathis et al. | 428/514 |
| 4,100,340 A * | 7/1978 | Waldmann et al. | 526/245 |
| 5,001,192 A * | 3/1991 | Sun | 525/76 |
| 5,091,483 A * | 2/1992 | Mazurek et al. | 525/477 |
| 6,365,769 B1 * | 4/2002 | Behr et al. | 560/147 |
| 6,599,972 B2 * | 7/2003 | Thames et al. | 524/398 |
| 6,740,173 B1 | 5/2004 | Pouyfaucon et al. | |
| 7,019,068 B2 | 3/2006 | Bodart et al. | |
| 2004/0198702 A1 | 10/2004 | Petrova et al. | |
| 2005/0171312 A1 | 8/2005 | Lacroix-Desmazes et al. | |

FOREIGN PATENT DOCUMENTS

| | | |
|---|---|---|
| EP | 0 185 464 | 6/1986 |
| JP | 11-209244 | 8/1999 |

OTHER PUBLICATIONS

U.S. Appl. No. 10/548,583, filed Sep. 12, 2005, Lannuzzel, et al.

* cited by examiner

POLYMER COMPOSITION

This application is a 371 of PCT/EP04/52272, filed Sep. 22, 2004.

The present invention relates to a polymer composition, to a process for preparing such a polymer composition, to its use for coating metal, polymer, paper or cellophane surfaces and for producing thin single-layer or multilayer films and moulded objects, to a process for coating such surfaces by means of said polymer composition and to the articles or parts of articles obtained.

In the extremely vast field of plastic materials, it is the practice to add to polymers additives intended to confer on them improved properties for use, such as additives for improving fire resistance or those for improving resistance to ultraviolet rays, plasticizers, dyes, antistatic agents, demisting agents or adhesion promoters. In certain cases, the desired improvement in a property lies in the mass of the polymer. In this case, the addition of an additive distributed within the mass makes it possible to obtain good effectiveness.

For other properties, the phenomena involved are first and foremost surface phenomena (towards the air) or interface phenomena (towards the coating support). In these cases, the distribution of the additive within the mass of the composition that it forms with the polymer has a major drawback in so far as it is not present at the site where it would be useful, which makes it necessary to introduce it in a greater amount than necessary in order for a sufficient amount to be present at the surface or at the interface. This overdose engenders an additional cost but can also have a negative influence on other properties of the material, such as the barrier properties and the mechanical properties. In certain cases, incompatibles additives may be used so as to obtain migration thereof towards the surface or towards the interface. In this case, the additives have a low molar mass and are rapidly washed from the surface to which they have migrated, thus resulting in a loss of effectiveness. This is, for example, the case of demisting agents which may be washed from the surface of a film by steam A major improvement in the field would therefore be to have polymer compositions comprising additives capable of migrating preferentially to where they are useful (polymer/air surface, polymer/metal interface, polymer 1/polymer 2 interface, etc.). Besides this selective migration, the additive should exhibit sufficient compatibility with the polymer in order to avoid being easily washed away.

In addition, in the field of coatings for metal surfaces, three layers are generally applied: the first being used for the adhesion, the second providing the properties of the coating and, finally, the finishing layer providing the surface properties. The use, in a single layer, of a composition comprising additives which would migrate to where they are necessary would also be a very great technological advance.

A subject of the present invention is such a polymer composition.

To this effect, the invention relates to a polymer composition comprising 1) a polymer (P1) comprising at least 50% by weight of monomeric units derived from an ethylenically unsaturated monomer (M1), and
2) at least one co-oligomer (O1) comprising at least:
   a) a component (A) comprising at least one monomeric unit identical to that derived from the monomer (M1) on which the polymer (P1) is based, and
   b) a component (B) comprising at least one monomeric unit (m2), derived from an ethylenically unsaturated monomer, carrying at least one group chosen from the following groups:
      —$C_aH_{2a+1}$ with a between 6 and 30,
      —$(CH_2)_b$—$C_cF_{2c+1}$ with b between 1 and 11 and c greater than or equal to 5,
      —$(CH_2)_d$—$(Si(CH_3)_2$—$O)_e$—$Si(CH_3)_3$ with d between 1 and 11 and e between 1 and 1000,
      —COOH,
      —$SO_3H$, and
      phosphonate groups —$PO(OH)(OR_1)$ with $R_1$ being a hydrogen atom or an allyl radical containing from 1 to 11 carbon atoms.

For the purposes of the present invention, the term "polymer (P1)" is intended to denote a polymer of molar mass greater than that of the co-oligomer (O1). The number-average molar mass, as determined for example by steric exclusion chromatography or by elemental analysis, of the polymer (P1) involved in the composition according to the invention is advantageously greater than 30 000. The number-average molar mass of the polymer (P1) is advantageously less than or equal to 2 000 000, preferably less than or equal to 1 000 000, particularly preferably less than or equal to 500 000, and most particularly preferably less than or equal to 250 000.

The polymer (P1) is also advantageously characterized by a polydispersity index (ratio of the weight-average molar mass to the number-average molar mass), as determined by size exclusion chromatography, of greater than or equal to 1. The polymer (P1) is advantageously characterized by a polydispersity index of less than or equal to 4.

For the purposes of the present invention, the expression "polymer (P1) comprising monomeric units derived from an ethylenically unsaturated monomer (M1)" is intended to denote the polymers which are obtained by addition polymerization. The polymer (P1) contains at least 50%, preferably at least 60%, particularly preferably at least 70%, by weight of monomeric units derived from the ethylenically unsaturated monomer (M1).

As examples of such polymers (P1), mention may be made of halogenated polymers, polymers of acrylic acid or of its esters, polymers of methacrylic acid or of its esters, polymers of acrylonitrile or of methacrylonitrile, polymers of acrylamide, of methacrylamide or of their derivatives, vinyl acetate polymers, polymers of itaconic acid, of maleic acid or of maleic anhydride, polymers of ethylene, of propylene, of butadiene, of isoprene or of styrene and of its derivatives.

Preferably, the polymer (P1) of the composition according to the invention is a halogenated polymer. The ethylenically unsaturated monomer (M1) is therefore, in this case, preferably a halogenated monomer.

The term "halogenated polymers" is intended to denote both the homopolymers of halogenated monomers and the copolymers that the halogenated monomers form with one another and/or with nonhalogenated monomers. In other words, the halogenated polymer advantageously comprises at least 50%, preferably at least 60%, particularly preferably at least 70%, by weight of monomeric units derived from a halogenated monomer.

The term "halogenated monomer" is intended to denote any ethylenically unsaturated monomer which comprises at least one halogen atom. As examples of halogenated monomers, mention may be made of brominated monomers such as vinyl bromide, fluorinated monomers such as vinylidene fluoride, vinyl fluoride, chlorotrifluoroethylene, trifluoroethylene, tetrafluoroethylene, hexafluoropropylene, allyl fluoride and 3,3,3-trifluoropropene, and chlorinated monomers.

Particularly preferably, the polymer (P1) of the composition according to the invention is a chlorinated polymer. The ethylenically unsaturated monomer (M1) is therefore, in this case, particularly preferably a chlorinated monomer.

The term "chlorinated polymer" is intended to denote both the homopolymers of chlorinated monomers and the copolymers that the chlorinated monomers form with one another and/or with nonchlorinated monomers. These copolymers may in particular be random copolymers, gradient copolymers, block copolymers or grafted copolymers. The chlorinated polymer advantageously comprises at least 50%, preferably at least 60%, particularly preferably at least 70%, by weight of monomeric units derived from a chlorinated monomer.

The term "chlorinated monomer" is intended to denote any ethylenically unsaturated monomer which comprises at least one chlorine atom. As examples of chlorinated monomers, mention may be made of chlorinated monomers in which the number of chlorine atoms is 1, chlorinated monomers in which the number of chlorine atoms is 2, trichloroethylene, 1,1,3-trichloropropene and tetrachloroethylene.

The term "nonchlorinated monomer" is intended to denote, for example, vinyl esters such as, for example, vinyl acetate, vinyl ethers, acrylic or methacrylic acids, esters and amides, acrylonitrile, methacrylonitrile, styrene and derivatives, butadiene, olefins such as, for example, ethylene and propylene, itaconic acid and maleic anhydride.

A first preferred family of chlorinated monomers consists of chlorinated monomers in which the number of chlorine atoms is 1. As examples of chlorinated monomers in which the number of chlorine atoms is 1, mention may be made of allyl chloride, crotyl chloride and, with most particular mention, vinyl chloride.

A second preferred family of chlorinated monomers consists of chlorinated monomers in which the number of chlorine atoms is 2. As examples of chlorinated monomers in which the number of chlorine atoms is 2, mention may be made of 1,1-dichloropropene, 1,3-dichloropropene, 2,3-dichloropropene and, with most particular mention, vinylidene chloride.

Most particularly preferably, the polymer (P1) of the composition according to the invention is a polymer of vinylidene chloride. The ethylenically unsaturated monomer (M1) is therefore, in this case, most particularly preferably vinylidene chloride.

Among the polymers of vinylidene chloride, copolymers of vinylidene chloride are preferred. For the purposes of the present invention, the term "copolymers of vinylidene chloride" is intended to denote the copolymers of vinylidene chloride, which is the major monomer, with one or more monomers that are copolymerizable with said monomer. The vinylidene chloride is therefore advantageously present in the resulting copolymers in a proportion of at least 50% by weight.

Among the monomers that are copolymerizable with vinylidene chloride, mention may be made, in a nonlimiting manner, of vinyl chloride, vinyl esters such as, for example, vinyl acetate, vinyl ethers, acrylic acids, esters and amides, methacrylic acids, esters and amides, acrylonitrile, methacrylonitrile, styrene, styrene derivatives, butadiene, olefins such as, for example, ethylene and propylene, itaconic acid and maleic anhydride.

Copolymers of vinylidene chloride that are particularly preferred are those containing, as copolymerizable monomers, vinyl chloride and/or at least one monomer chosen from maleic anhydride and the (meth)acrylic monomers corresponding to the general formula:

$$CH_2=CR_2R_3$$

in which $R_2$ is chosen from hydrogen, the methyl radical and the radical —COOH, and $R_3$ is chosen from the radical —CN, the radical —CH$_2$—COOH and the radical —CO—$R_4$ in which $R_4$ is chosen from the radical —OH, the radicals —O—$R_5$ with $R_5$ chosen from the alkyl radicals containing from 1 to 18 carbon atoms optionally carrying one or more radicals —OH and the alkoxyalkyl radicals containing a total of 1 to 10 carbon atoms and, finally, $R_4$ is also chosen from the radicals —NR$_6$R$_7$ in which $R_6$ and $R_7$, which are the same or different, are chosen from hydrogen and the alkyl radicals containing from 1 to 10 carbon atoms, optionally carrying one or more radicals —OH.

Copolymers of vinylidene chloride that are most particularly preferred are those containing, as copolymerizable monomers, vinyl chloride and/or at least one monomer chosen from maleic anhydride and (meth)acrylic monomers, namely methyl acrylate, methyl methacrylate, ethyl acrylate, ethyl methacrylate, n-butyl acrylate, ethylene glycol methacrylate, acrylonitrile, methacrylonitrile, acrylic acid, methacrylic acid, itaconic acid, acrylamide and N-methylolacrylamide.

In general, the amount of vinylidene chloride in the copolymers of vinylidene chloride ranges from 50 to 95% by weight, preferably from 60 to 95% by weight, particularly preferably from 70 to 95% by weight.

In general, the amount of vinyl chloride in the copolymers of vinylidene chloride ranges from 3 to 50% by weight, preferably from 3 to 40% by weight, particularly preferably from 4.5 to 30% by weight.

In general, the amount of maleic anhydride and/or of the (meth)acrylic monomer(s) in the copolymers of vinylidene chloride ranges from 1 to 50% by weight, preferably from 2 to 40% by weight, particularly preferably from 2 to 30% by weight.

The polymer (P1) involved in the composition according to the invention can be prepared by any known process of addition polymerization. It is preferably prepared by a process of radical polymerization, whether mass polymerization, polymerization in solution in a solvent or aqueous-dispersion polymerization. When the polymer (P1) is a vinylidene chloride polymer, it is particularly preferably prepared by a process of aqueous-dispersion radical polymerization, and most particularly preferably by a process of aqueous-suspension radical polymerization or by a process of aqueous-emulsion radical polymerization.

For the purposes of the present invention, the expression "aqueous-dispersion polymerization" is intended to denote aqueous-suspension radical polymerization as well as aqueous-emulsion radical polymerization and aqueous-microsuspension polymerization.

For the purposes of the present invention, the expression "aqueous-suspension radical polymerization" is intended to denote any process of radical polymerization that is carried out in aqueous medium in the presence of oleosoluble radical initiators and dispersing agents.

For the purposes of the present invention, the expression "aqueous-emulsion radical polymerization" is intended to denote any process of radical polymerization that is carried out in aqueous medium in the presence of water-soluble radical initiators and emulsifiers.

For the purposes of the present invention, the expression "aqueous-microsuspension polymerization", also referred to as polymerization in homogenized aqueous dispersion or miniemulsion, is intended to denote any process of radical polymerization in which oleosoluble initiators are used and an emulsion of droplets of monomers is prepared by means of vigorous mechanical stirring and the presence of emulsifiers.

The expression "at least one co-oligomer (O1)" is intended to denote that the polymer composition according to the invention must contain at least one co-oligomer (O1), but that it may contain several thereof. It preferably comprises just one thereof.

For the purposes of the present invention, the term "co-oligomer (O1)" is intended to denote a copolymer of low molar mass. The number-average molar mass, as determined, for example, by size exclusion chromatography or elemental analysis, of the co-oligomer (O1) involved in the composition according to the invention is advantageously greater than or equal to 100, preferably greater than or equal to 500 and particularly preferably greater than or equal to 1000. The number-average molar mass of the co-oligomer (O1) is advantageously less than or equal to 30 000, preferably less than or equal to 25 000, and particularly preferably less than or equal to 20 000.

The co-oligomer (O1) is also advantageously characterized by a poly-dispersity index (ratio of the weight-average molar mass to the number-average molar mass), as determined by steric exclusion chromatography, of greater than or equal to 1. The co-oligomer (O1) is advantageously characterized by a poly-dispersity index of less than or equal to 3, preferably of less than or equal to 2.5, particularly preferably of less than or equal to 2.

The chain of monomeric units in the co-oligomer (O1) is advantageously of the random, alternating, block or gradient type, and preferably of the block or gradient type. The structure of the co-oligomer (O1) is advantageously linear or branched (for example grafted, comb-branched or star-branched) and preferably linear. The co-oligomer (O1) is particularly preferably characterized by a linear structure with a chain of monomeric units of block or gradient type.

In the co-oligomer (O1), the component (A) comprises at least one monomeric unit identical to that derived from the ethylenically unsaturated monomer (M1) on which the polymer (P1) as defined above is based, preferably identical to that derived from a halogenated monomer as defined above, particularly preferably identical to that derived from a chlorinated monomer as defined above, most particularly preferably identical to that of vinylidene chloride.

Component (A) of the co-oligomer (O1) comprises at least one monomeric unit derived from the monomer (M1). Preferably, the monomeric units derived from the monomer (M1) of component A represent at least 10% by weight, and particularly preferably at least 25% by weight, of the co-oligomer (O1).

Advantageously, the monomeric units derived from the monomer (M1) of component A represent at most 90% by weight, preferably at most 85% by weight, and particularly preferably at most 75% by weight, of the co-oligomer (O1).

Component (A) of the co-oligomer (O1) may comprise at least one monomeric unit derived from at least one monomer that is copolymerizable with the monomer (M1) as defined above, i.e. a halogenated monomer and/or a nonhalogenated monomer if (M1) is preferably a halogenated monomer, a chlorinated monomer and/or a nonchlorinated monomer if (M1) is particularly preferably a chlorinated monomer, or a monomer that is copolymerizable with vinylidene chloride if (M1) is most particularly preferably vinylidene chloride.

Component (A) of the co-oligomer (O1) advantageously comprises at least one monomeric unit derived from at least one monomer that is copolymerizable with the monomer (M1). Preferably, the monomeric units derived from at least one monomer that is copolymerizable with the monomer (M1) of component A represent at least 2% by weight, and particularly preferably at least 5% by weight, of the co-oligomer (O1).

Advantageously, the monomeric units derived from at least one monomer that is copolymerizable with the monomer (M1) of component A represent at most 50% by weight, preferably at most 30% by weight, and particularly preferably at most 25% by weight, of the co-oligomer (O1).

In the co-oligomer, component (B) comprises at least one monomeric unit (m2), derived from an ethylenically unsaturated monomer, carrying at least one group chosen from the following groups:
- —$C_aH_{2a+1}$ with a between 6 and 30,
- —$(CH_2)_b$—$C_cF_{2c+1}$ with b between 1 and 11 and c greater than or equal to 5,
- —$(CH_2)_d$—$(Si(CH_3)_2$—$O)_e$—$Si(CH_3)_3$ with d between 1 and 11 and e between 1 and 1000,
- —COOH,
- —$SO_3H$, and
- the phosphonate groups —$PO(OH)(OR_1)$ with $R_1$ being a hydrogen atom or an alkyl radical containing from 1 to 11 carbon atoms.

The ethylenically unsaturated monomer from which the monomeric unit (m2) carrying at least one group chosen from the groups mentioned above is derived can be an ethylenically unsaturated monomer (M2) that is itself carrying at least one of the groups concerned, but also, when the group concerned is —COOH, —$SO_3H$ or a phosphonate group —$PO(OH)(OR_1)$ with $R_1$ being a hydrogen atom or an alkyl radical containing from 1 to 11 carbon atoms, an ethylenically unsaturated monomer (M2') carrying at least one group which, after total or partial cleavage, results in the group concerned. The term "cleavage" is intended to mean any reaction which makes it possible to obtain the groups —COOH, —$SO_3H$ or —$PO(OH)(OR_1)$. The hydrolysis reaction is a particularly preferred case of cleavage.

As monomer (M2) carrying at least one group —$C_aH_{2a+1}$ with a between 6 and 30, from which the corresponding monomeric unit (m2) is derived, mention may, for example, be made of the following monomers:

$CH_2$=CH—CO—O—$C_aH_{2a+1}$,
$CH_2$=$C(CH_3)$—CO—O—$C_aH_{2a+1}$,
X—O—CO—CH=CH—CO—O—$C_aH_{2a+1}$ with X being any group,
$CH_2$=$C(CH_2$—CO—O—$C_aH_{2a+1})$(CO—O—X) with X being any group,
$CH_2$=$C(CH_2$—CO—O—X)(CO—O—$C_aH_{2a+1})$ with X being any group,
$CH_2$=C(O—CO—$C_aH_{2a+1})$(CO—O—X) with X being any group, and
$CH_2$=C(O—CO—X)(CO—O—$C_aH_{2a+1})$ with X being any group.

In the monomeric unit (m2) carrying at least one group —$C_aH_{2a+1}$, a is advantageously greater than or equal to 6 and preferably greater than or equal to 12. a is advantageously less than or equal to 30 and preferably less than or equal to 20. a is particularly preferably equal to 18.

As monomer (M2) carrying at least one group —$(CH_2)_b$—$C_cF_{2c+1}$ with b between 1 and 11 and c greater than or equal to 5, from which the corresponding monomeric unit (m2) is derived, mention may, for example, be made of the following monomers:

$CH_2$=CH—CO—O—$(CH_2)_b$—$C_cF_{2c+1}$,
$CH_2$=$C(CH_3)$—CO—O—$(CH_2)_b$—$C_cF_{2c+1}$,
$CH_2$=CH—CO—O—$(CH_2)_f$—$NR_8$—$SO_2$—$(CH_2)_b$—$C_cF_{2c}$, with $R_8$ being a hydrogen atom or a radical —$CH_3$ and f being between 1 and 15 and preferably between 2 and 11, particularly preferably f being equal to 2, X—O—CO—CH=CH—CO—O—$(CH_2)_b$—$C_cF_{2c+1}$, with X being any group, $CH_2$=CH—$C_6H_4$—$CH_2$—O—$(CH_2)_b$—$C_cF_{2c+1}$, $CH_2$=CH—O—CO—$(CH_2)_b$—$C_cF_{2c+1}$, $CH_2$=C($CH_2$—CO—O—X)(CO—O—$(CH_2)_b$—$C_cF_{2c+1}$) with X being any group, $CH_2$=C(CO—O—X)($CH_2$—CO—O—$(CH_2)_b$—$C_cF_{2c+1}$) with X being any group, and $CH_2$=C(O—CO—X)(CO—O—$(CH_2)_b$—$C_cF_{2c+1}$) with X being any group.

In the monomeric unit (m2) carrying at least one group —$(CH_2)_b$—$C_cF_{2c+1}$, b is advantageously greater than or equal to 1. b is advantageously less than or equal to 11, preferably less than or equal to 5, and particularly preferably less than or equal to 3. c is advantageously greater than or equal to 5 and preferably greater than or equal to 6. c is preferably less than or equal to 20 and particularly preferably less than or equal to 10. c is most particularly preferably equal to 8.

When component (B) of the co-oligomer (O1) comprises at least one monomeric unit (m2), derived from an ethylenically unsaturated monomer, carrying at least one group —$(CH_2)_b$—$C_cF_{2c+1}$, the co-oligomer (O1) is most particularly preferably characterized by a linear structure with a chain of monomeric units of block type.

As monomer (M2) carrying at least one group —$(CH_2)_d$—$(Si(CH_3)_2$—$O)_e$—$Si(CH_3)_3$ with d between 1 and 11 and e between 1 and 1000, from which the corresponding monomeric unit (m2) is derived, mention may be made of:

$CH_2$=CH—CO—O—$(CH_2)_d$—$(Si(CH_3)_2$—$O)_e$—$Si(CH_3)_3$, $CH_2$=C($CH_3$)—CO—O—$(CH_2)_d$—$(Si(CH_3)_2$—$O)_e$—$Si(CH_3)_3$, $CH_2$=CH—O—$(CH_2)_d$—$(Si(CH_3)_2$—$O)_e$—$Si(CH_3)_3$,

X—O—CO—CH=CH—CO—O—$(CH_2)_d$—$(Si(CH_3)_2$—$O)_e$—$Si(CH_3)_3$ with X being any group, $CH_2$=C(O—CO—X)(CO—O—$(CH_2)_d$—$(Si(CH_3)_2$—$O)_e$—$Si(CH_3)_3$) with X being any group, $CH_2$=C(CO—O—X)($CH_2$—CO—O—$(CH_2)_d$—$(Si(CH_3)_2$—$O)_e$—$Si(CH_3)_3$) with X being any group, and $CH_2$=C($CH_2$—CO—O—X)(CO—O—$(CH_2)_d$—$(Si(CH_3)_2$—$O)_e$—$Si(CH_3)_3$) with X being any group.

In the monomeric unit (m2) carrying at least one group —$(CH_2)_d$—$(Si(CH_3)_2$—$O)_e$—$Si(CH_3)_3$, d is advantageously greater than or equal to 1. d is advantageously less than or equal to 11, preferably less than or equal to 5, and particularly preferably less than or equal to 3. e is advantageously greater than or equal to 1. e is advantageously less than or equal to 1000, preferably less than or equal to 500, and particularly preferably less than or equal to 100.

As monomer (M2) carrying at least one group —COOH, from which the corresponding monomeric unit (m2) is derived, mention may be made of:

CH=CH—COOH, $CH_2$=C($CH_3$)—COOH, $CH_2$=C($CH_2$—COOH)(COOH),

HOOC—CH=CH—COOH, $CH_2$=CH—CO—O—Y—COOH with Y being $C_6H_4$ or $C_gH_{2g}$ in which g is between 1 and 15, $CH_2$=C($CH_3$)—CO—O—Y—COOH with Y being $C_6H_4$ or $C_gH_{2g}$ in which g is between 1 and 15, HOOC—Y—O—CO—CH=CH—CO—O—X with Y being $C_6H_4$ or $C_gH_{2g}$ in which g is between 1 and 15 and X being any group, $CH_2$=C(O—CO—X)(CO—O—Y—COOH) with Y being $C_6H_4$ or $C_gH_{2g}$ in which g is between 1 and 15 and X being any group, $CH_2$=C(O—CO—Y—COOH)(CO—O—X) with Y being $C_6H_4$ or $C_gH_{2g}$ in which g is between 1 and 15 and X being any group, $CH_2$=CH—CO—NH—Y—COOH with Y being $C_6H_4$ or $C_gH_{2g}$ in which g is between 1 and 15, $CH_2$=C($CH_3$)—CO—NH—Y—COOH with Y being $C_6H_4$ or $C_gH_{2g}$ in which g is between 1 and 15, $CH_2$=CH—Y—COOH with Y being $C_6H_4$ or $C_gH_{2g}$ in which g is between 1 and 15, $CH_2$=C($CH_3$)—Y—COOH with Y being $C_6H_4$ or $C_gH_{2g}$ in which g is between 1 and 15, $CH_2$=CH—$CH_2$—COOH, and $CH_2$=C($CH_3$)—$CH_2$—COOH.

As monomer (M2') carrying at least one group which, after cleavage, results in the group —COOH, from which the corresponding monomeric unit (m2) is derived, mention may be made of the anhydrides and the esters, of which the alkyl radicals advantageously contain from 1 to 11, preferably from 1 to 6, and most particularly preferably from 1 to 3 carbon atoms, of the carboxylic acids mentioned above.

Preferably, the monomeric unit (m2) carrying a group —COOH is a monomeric unit carrying a group —Y—COOH in which Y is chosen from $C_6H_4$ and $C_gH_{2g}$ in which g is between 1 and 15.

Particularly preferably, the monomeric unit (m2) carrying a group —COOH is a monomeric unit carrying a group —Y—COOH in which Y is $C_gH_{2g}$ in which g is between 1 and 15.

g is advantageously greater than or equal to 1. g is advantageously less than or equal to 15, preferably less than or equal to 11, particularly preferably less than or equal to 5, and most particularly preferably less than or equal to 3.

As monomer (M2) carrying at least one group —$SO_3H$, from which the corresponding monomeric unit (m2) is derived, mention may be made of:

$CH_2$=CH-Z-$SO_3H$, with Z being $C_6H_4$ or CR'R" with R' and R", which are the same or different, representing a hydrogen atom or an alkyl radical containing from 1 to 20 carbon atoms, $CH_2$=CH—CO—O—$C_hH_{2h}$-Z-$SO_3H$ with h between 0 and 12 and Z being $C_6H_4$ or CR'R" with R' and R", which are the same or different, representing a hydrogen atom or an alkyl radical containing from 1 to 20 carbon atoms, $CH_2$=C($CH_3$)—CO—O—$C_hH_{2h}$-Z-$SO_3H$ with h between 0 and 12 and Z being $C_6H_4$ or CR'R" with R' and R", which are the same or different, representing a hydrogen atom or an alkyl radical containing from 1 to 20 carbon atoms, X—O—CO—CH=CH—CO—O—$C_hH_{2h}$-Z-$SO_3H$ with h between 0 and 12, with X being any group and Z being $C_6H_4$ or CR'R" with R' and R", which are the same or different, representing a hydrogen atom or an alkyl radical containing from 1 to 20 carbon atoms, $CH_2$=CH—CO—NH—$C_hH_{2h}$-Z-$SO_3H$ with h between 0 and 12 and Z being $C_6H_4$ or CR'R" with R' and R", which are the same or different, representing a hydrogen atom or an alkyl radical containing from 1 to 20 carbon atoms, $CH_2$=C($CH_3$)—CO—NH—$C_hH_{2h}$-Z-$SO_3H$ with h between 0 and 12 and Z being $C_6H_4$ or CR'R" with R' and R", which are the same or different, representing a hydrogen atom or an alkyl radical containing from 1 to 20 carbon atoms, $CH_2$=CH—CO—NH—C($CH_3$)$_2$—$SO_3H$, and $CH_2=C(CH_3)$-Z-$SO_3H$ with Z being $C_6H_4$ or CR'R" with R' and R", which are the same or different representing a hydrogen atom or an alkyl radical containing from 1 to 20 carbon atoms.

As monomer (M2') carrying at least one group which, after cleavage, results in the group —$SO_3H$, from which the corresponding monomeric unit (m2) is derived, mention may be made of the esters, the alkyl radicals of which advantageously contain from 1 to 11, preferably from 1 to 6, and most particularly preferably from 1 to 5 carbon atoms, of the sulphonic acids mentioned above.

Preferably, the monomeric unit (m2) carrying a group —$SO_3H$ is a monomeric unit carrying a group -Z-$SO_3H$ in which Z is chosen from $C_6H_4$ and CR'R" with R' and R", which are the same or different, representing a hydrogen atom or an alkyl radical containing from 1 to 20 carbon atoms.

When R' and R", which are the same or different, represent an alkyl radical, R' and R" advantageously contain from 1 to 20 carbon atoms, preferably from 1 to 15 carbon atoms, particularly preferably from 1 to 10 carbon atoms, and most particularly preferably from 1 to 8 carbon atoms. The case where R' and R" are both a methyl radical is most particularly preferred.

Particularly preferably, the monomeric unit (m2) carrying a group —$SO_3H$ is a monomeric unit carrying a group -Z-$SO_3H$ derived from an ethylenically unsaturated monomer chosen from the following monomers:

$CH_2=CH-C_6H_4-SO_3H$, $CH_2=CH-CO-NH-C_hH_{2h}-C(CH_3)_2-SO_3H$ with h between 0 and 12, and the corresponding sulphonic acid esters, the alkyl radicals of which advantageously contain from 1 to 11, preferably from 1 to 6, and most particularly preferably from 1 to 5 carbon atoms.

As monomer (M2) carrying at least one phosphonate group —PO(OH)($OR_1$) with $R_1$ being a hydrogen atom or an alkyl radical containing from 1 to 11 carbon atoms, from which the corresponding monomeric unit (m2) is derived, mention may be made of:

$CH_2=CR_9-CO-O-(CH_2)_i-PO(OH)(OR_1)$ with $R_9$ being a hydrogen atom or a methyl radical and i being between 1 and 20, $CH_2=CR_9-CO-O-CR_{10}R_{11}-PO(OH)(OR_1)$ with $R_9$ being a hydrogen atom or a methyl radical and $R_{10}$ and $R_{11}$, which are the same or different, being a hydrogen atom or an alkyl radical containing from 1 to 11 carbon atoms,

$CH_2=CR_9-CO-O-CH_2-CH(OH)-CH_2-PO(OH)(OR_1)$ with $R_9$ being a hydrogen atom or a methyl radical, $CH_2=CR_9-CO-O-CH_2-CH(OH)-CH_2-CO-O-(CH_2)_2-PO(OH)(OR_1)$ with $R_9$ being a hydrogen atom or a methyl radical, $CH_2=CR_9-CO-O-CH_2-CH_2-NH-CO-O-(CH_2)_i-PO(OH)(OR_1)$ with $R_9$ being a hydrogen atom or a methyl radical and i being between 1 and 20, $CH_2=CR_9-CO-O-CH_2-CH_2-NH-CO-O-CR_{10}R_{11}-PO(OH)(OR_1)$ with $R_9$ being a hydrogen atom or a methyl radical and $R_{10}$ and $R_{11}$, which are the same or different, being a hydrogen atom or an alkyl radical containing from 1 to 11 carbon atoms, $CH_2=C(CH_3)-C_6H_4-C(CH_3)_2-NH-CO-O-(CH_2)_i-PO(OH)(OR_1)$ with i being between 1 and 20, $CH_2=C(CH_3)-C_6H_4-C(CH_3)_2-NH-CO-O-CR_{10}R_{11}-PO(OH)(OR_1)$ with $R_{10}$  $R_{11}$, which are the same or different, being a hydrogen atom or an alkyl radical containing from 1 to 11 carbon atoms and the substitution of the aromatic ring being in the meta-position, $CH_2=CH-C_6H_4-CH_2-PO(OH)(OR_1)$ with the substitution of the aromatic ring being a mixture of ortho- and para-substitution, $CH_2=CH-PO(OH)(OR_1)$, X-O-CO-CH=CH-CO-O$(CH_2)_i$-$CR_{10}R_{11}$-PO(OH)($OR_1$) with $R_{10}$ and $R_{11}$, which are the same or different, being a hydrogen atom or an alkyl radical, i being between 1 and 20 and X being any group, $CH_2=C(O-CO-X)(CO-O-(CH_2)_i-CR_{10}R_{11}-PO(OH)(OR_1))$ with $R_{10}$ and $R_{11}$, which are the same or different, being a hydrogen atom or an alkyl radical, i being between 1 and 20 and X being any group, $CH_2=C(CH_2-CO-O-X)(CO-O-(CH_2)_i-CR_{10}R_{11}-PO(OH)(OR_1))$ with $R_{10}$ and $R_{11}$, which are the same or different, being a hydrogen atom or an alkyl radical, i being between 1 and 20 and X being any group, and $CH_2=C(CO-O-X)(CH_2-CO-O-(CH_2)_i-CR_{10}R_{11}-PO(OH)(OR_1))$ with $R_{10}$ and $R_{11}$, which are the same or different, being a hydrogen atom or an alkyl radical, i being between 1 et 20 and X being any group.

As monomer (M2') carrying at least one group which, after total or partial cleavage (for example hemihydrolysis), results in the phosphonate group —PO(OH)($OR_1$) (with $R_1$ being a hydrogen atom or an alkyl radical containing from 1 to 11 carbon atoms), from which the corresponding monomeric unit (m2) is derived, mention may be made of the monomers (M2') carrying at least one group —PO($OR_1$)($OR_2$) with $R_1$, and $R_2$, which are the same or different, representing an alkyl radical containing from 1 to 11 carbon atoms.

In the monomeric unit (m2) carrying at least one group —PO(OH)($OR_1$), $R_1$ is a hydrogen atom or an alkyl radical containing from 1 to 11 carbon atoms.

When $R_1$ is an allyl radical, $R_1$ advantageously contains from 1 to 11 carbon atoms, preferably from 1 to 8 carbon atoms, and particularly preferably from 1 to 5. The cases where $R_1$ is either a methyl radical or an ethyl radical are most particularly preferred.

The term "phosphonate group —PO(OH)($OR_1$)" is intended to denote the groups —PO(OH)($OR_1$) attached to a carbon atom and not the phosphate groups —O—P(O)$(OR)_2$ with R being a hydrogen atom or an alkyl radical in which the phosphorus atom is attached to an oxygen atom.

When component (B) of the co-oligomer (O1) comprises at least one monomeric unit (m2), derived from an ethylenically unsaturated monomer, carrying at least one phosphonate group —PO(OH)($OR_1$), the co-oligomer (O1) is most particularly preferably characterized by a linear structure with a chain of monomeric units of gradient type.

When, in the co-oligomer (O1), component (B) comprises at least one monomeric unit (m2), derived from an ethylenically unsaturated monomer (M2'), carrying at least one group which, after cleavage, results in the group concerned, namely —COOH, —$SO_3H$ or a phosphonate group —PO(OH)($OR_1$) with $R_1$ being a hydrogen atom or an alkyl radical containing from 1 to 11 carbon atoms, the cleavage may be carried out during the synthesis of the co-oligomer (O1), during the preparation of the polymer composition, as subsequently explained in detail, or during the use of the polymer composition. The cleavage preferably takes place during the synthesis of the co-oligomer (O1).

In the particular case where, in the co-oligomer (O1), component (B) comprises at least one monomeric unit (m2), derived from an ethylenically unsaturated monomer (M2'), carrying at least one group which, after cleavage, results in the phosphonate group —PO(OH)($OR_1$) with $R_1$ being a hydrogen atom or an alkyl radical containing from 1 to 11 carbon atoms, the total cleavage (so that $R_1$ is a hydrogen atom) or the partial cleavage, in particular the hemi-hydrolysis, (so that $R_1$ is an alkyl radical containing from 1 to 11 carbon atoms), of the ethylenically unsaturated monomer (M2') carrying at least one group —PO(OR$_{1'}$)(OR$_{2'}$) with $R_{1'}$ and $R_{2'}$, which are the same or different, representing an alkyl radical containing from 1 to 11 carbon atoms, may be carried out as described, respectively, in C. Brondino, B. Boutevin, Y. Hervaud, N. Pelaprat & A. Manseri, J. Fluorine Chem., 1996, 76, 193 and B. Boutevin, Y. Hervaud, T. Jeanmaire, A. Boulahna, M. Elasri, Phosph. Sulfur and Silicon, 2001, 174,1.

Component (B) of the co-oligomer (O1) comprises at least one monomeric unit (m2). Preferably, the monomeric units (m2) of component (B) represent at least 10% by weight, and particularly preferably at least 15% by weight, of the co-oligomer (O1).

Advantageously, the monomeric units (m2) of component (B) represent at most 80% by weight, preferably at most 75% by weight, and particularly preferably at most 70% by weight, of the co-oligomer.

Component (B) of the co-oligomer (O1) preferably comprises at least one monomeric unit (m2), derived from an ethylenically unsaturated monomer, carrying at least one group chosen from the following groups:
- —(CH$_2$)$_b$—C$_c$F$_{2c+1}$ with b between 1 and 11 and c greater than or equal to 5, and
- the phosphonate groups —PO(OH)(OR$_1$) with $R_1$ being a hydrogen atom or an alkyl radical containing from 1 to 11 carbon atoms.

According to a first preferred embodiment, component (B) of the co-oligomer (O1) advantageously comprises at least one monomeric unit (m2), derived from an ethylenically unsaturated monomer, carrying at least one group chosen from the groups —(CH$_2$)$_b$—C$_c$F$_{2c+1}$ with b between 1 and 11 and c greater than or equal to 5.

According to this first preferred embodiment, the ethylenically unsaturated monomer from which the monomeric unit (m2) carrying at least one group chosen from the groups mentioned above is derived is advantageously an ethylenically unsaturated monomer (M2) that is itself carrying at least one of the groups concerned.

Preferably, the monomer (M2) carrying at least one group chosen from the groups —(CH$_2$)$_b$—C$_c$F$_{2c+1}$ is chosen from the following monomers:
CH$_2$=CH—CO—O—(CH$_2$)$_b$—C$_c$F$_{2c+1}$,
CH$_2$=C(CH$_3$)—CO—O—(CH$_2$)$_b$—C$_c$F$_{2c+1}$,
CH$_2$=CH—CO—O—(CH$_2$)$_f$—NR$_8$—SO$_2$—(CH$_2$)$_b$—C$_c$F$_{2c+1}$, with $R_8$ being a hydrogen atom or a radical —H$_3$ and f being between 1 and 15, preferably between 1 and 11,
CH$_2$=CH—C$_6$H$_4$—CH$_2$—O—(CH$_2$)$_b$—C$_c$F$_{2c+1}$, and
CR$_2$=CH—O—CO—(CH$_2$)$_b$—C$_c$F$_{2c+1}$, in which b is between 1 and 11 and c is greater than or equal to 5 with the preferences defined above for b and c.

Particularly preferably, the monomer (M2) carrying at least one group chosen from the groups —(CH$_2$)$_b$—C$_c$F$_{2c+1}$, is chosen from the following monomers:
CH$_2$=CH—CO—O—(CH$_2$)$_b$—C$_c$F$_{2c+1}$, and
CH$_2$=C(CH$_3$)—CO—O—(CH$_2$)$_b$—C$_c$F$_{2c+1}$, in which b is between 1 and 11 and c is greater than or equal to 5, with the preferences defined above for b and c.

A monomer (M2) carrying at least one group —(CH$_2$)$_b$—C$_c$F$_{2c+1}$ that is most particularly preferred is 1H, 1H, 2H, 2H-heptadecafluorodecyl acrylate (FDA).

According to this first preferred embodiment, as a complement to that which has already been defined above, good results have been obtained when the monomeric units derived from the monomer (M1) of component (A) of the co-oligomer (O1) represent at least 25% and at most 30% by weight, the monomeric units derived from at least one monomer that is copolymerize with the monomer (M1) of component (A) represent at least 5% and at most 10% by weight and the monomeric units (m2) of component (B) represent at least 60% and at most 70% by weight of the total weight of the co-oligomer.

According to a second preferred embodiment, component (B) of the co-oligomer (O1) advantageously comprises at least one monomeric unit (m2), derived from an ethylenically unsaturated monomer, carrying at least one group chosen from the phosphonate groups —PO(OH)(OR$_1$) with $R_1$ being a hydrogen atom or an alkyl radical containing from 1 to 11 carbon atoms.

According to this second preferred embodiment, the ethylenically unsaturated monomer from which the monomeric unit (m2) carrying at least one group chosen from the groups mentioned above is derived is advantageously an ethylenically unsaturated monomer (M2) that is itself carrying at least one of the groups concerned or an ethylenically unsaturated monomer (M2') carrying at least one group which, after cleavage, results in the group concerned.

Preferably, the monomeric unit (m2) carrying at least one group chosen from the phosphonate groups —PO(OH)(OR$_1$) is derived from an ethylenically unsaturated monomer chosen from the following monomers:
CH$_2$=CR$_9$—CO—O—(CH$_2$)$_i$—PO(OH)(OR$_1$) with $R_9$ being a hydrogen atom or a methyl radical and i being between 1 and 20,
CH$_2$=CR$_9$—CO—O—CR$_{10}$R$_{11}$—PO(OH)(OR$_1$) with $R_9$ being a hydrogen atom or a methyl radical and $R_{10}$ and $R_{11}$, which are the same or different, being a hydrogen atom or an alkyl radical containing from 1 to 11 carbon atoms,
CH$_2$=CR$_9$—CO—O—CH$_2$—CH(OH)—CH$_2$—PO(OH)(OR$_1$) with $R_9$ being a hydrogen atom or a methyl radical,
CH$_2$=CR$_9$—CO—O—CH$_2$—CH(OH)—CH$_2$—CO—O—(CH$_2$)$_2$—PO(OH)(OR$_1$) with $R_9$ being a hydrogen atom or a methyl radical,
CH$_2$=CR$_9$—CO—O—CH$_2$—CH$_2$—NH—CO—O—(CH$_2$)$_i$—PO(OH)(OR$_1$) with $R_9$ being a hydrogen atom or a methyl radical and i being between 1 and 20,
CH$_2$=CR$_9$—CO—O—CH$_2$—CH$_2$—NH—CO—O—CR$_{10}$R$_{11}$—PO(OH)(OR$_1$) with $R_9$ being a hydrogen atom or a methyl radical and $R_{10}$ and $R_{11}$, which are the same or different, being a hydrogen atom or an alkyl radical containing from 1 to 11 carbon atoms,
CH$_2$=C(CH$_3$)—C$_6$H$_4$—C(CH$_3$)$_2$—NH—CO—O—(CH$_2$)$_i$—PO(OH)(OR$_1$) with i between 1 and 20,
CH$_2$=C(CH$_3$)—C$_6$H$_4$—C(CH$_3$)$_2$—NH—CO—O—CR$_{10}$R$_{11}$—PO(OH)(OR$_1$) with $R_{10}$ and $R_{11}$, which are the same or different, being a hydrogen atom or an alkyl radical containing from 1 to 11 carbon atoms and the substitution of the aromatic ring being in the meta-position,
CH$_2$=CH—C$_6$H$_4$—CH$_2$—PO(OH)(OR$_1$) with the substitution of the aromatic ring being a mixture of ortho- and para-substitution,
CH$_2$=CH—PO(OH)(OR$_1$), in which $R_1$ is a hydrogen atom or an alkyl radical containing from 1 to 11 carbon atoms, with the preferences defined above when $R_1$ is an alkyl radical, and
the corresponding monomers carrying at least one group —PO(OR$_{1'}$)(OR$_{2'}$) with $R_{1'}$ and $R_{2'}$, which are the same or different, representing an alkyl radical containing from 1 to 11 carbon atoms which, after total cleavage or partial cleavage (in particular hemihydrolysis), results in the phosphonate group —PO(OH)(OR$_1$) with $R_1$ being a hydrogen atom or an alkyl radical containing from 1 to 11 carbon atoms.

In the formulae mentioned above, i is advantageously between 1 and 20, preferably between 1 and 11, and particularly preferably between 1 and 3.

In the formulae mentioned above, $R_{10}$ and $R_{11}$, which are the same or different, are advantageously a hydrogen atom or an alkyl radical containing from 1 to 11 carbon atoms. When they are an alkyl radical, this radical preferably contains from 1 to 8 carbon atoms.

Particularly preferably, the monomeric unit (m2) carrying at least one group chosen from the phosphonate groups —PO(OH)($OR_1$) is derived from an ethylenically unsaturated monomer chosen from the following monomers:

$CH_2$=$R_9$—CO—O—$(CH_2)_i$—PO(OH)($OR_1$) with $R_9$ being a hydrogen atom or a methyl radical and i being between 1 and 20, with the preferences defined above, $CH_2$=$CR_9$—CO—O—$CH_2$—CH2—NH—CO—O—$(CH_2)_i$—PO(OH)($OR_1$) with $R_9$ being a hydrogen atom or a methyl radical and i being between 1 and 20, $CH_2$=CH—PO(OH)($OR_1$), and the corresponding monomers carrying at least one group —PO($OR_{1'}$)($OR_{2'}$) with $R_{1'}$ and $R_{2'}$, which are the same or different, representing an alkyl radical containing from 1 to 11 carbon atoms which, after total cleavage or partial cleavage (in particular hemihydrolysis), results in the phosphonate group —PO(OH)($OR_1$) with $R_1$ being a hydrogen atom or an alkyl radical containing from 1 to 11 carbon atoms.

Most particularly preferably, the monomeric unit (m2) carrying at least one group chosen from the phosphonate groups —PO(OH)($OR_1$) is derived from an ethylenically unsaturated monomer chosen from the following monomers:

1. 2-methacryloxyethylphosphonic acid (MAPHOS($OH)_2$)
$CH_2$=C($CH_3$)—CO—O—$(CH_2)_2$—PO$(OH)_2$
2. 2-methacryloxyethyl-6-carbamoyloxyethylphosphonic acid (MAUPHOS($OH_2$))
$CH_2$=C($CH_3$)—CO—O—$CH_2$—$CH_2$—NH—CO—O—$(CH_2)_2$—PO$(OH)_2$, and
3. vinylphosphonic acid
$CH_2$=CH—PO$(OH)_2$ and the corresponding monomers carrying at least one group —PO($OR_{1'}$)($OR_{2'}$) with $R_{1'}$ and $R_{2'}$, which are the same or different, representing an alkyl radical containing from 1 to 11 carbon atoms which, after cleavage, results in the phosphonate group —PO$(OH)_2$.

According to this second preferred embodiment, as a complement to that which has already been defined above, good results have been obtained when the monomeric units derived from the monomer (M1) of component (A) of the co-oligomer (O1) represent at least 65% and at most 75% by weight, the monomeric units derived from at least one monomer that is copolymerizable with the monomer (M1) of component (A) represent at least 5% and at most 15% by weight and the monomeric units (m2) of component (B) represent at least 15% and at most 25% by weight of the total weight of the co-oligomer.

The co-oligomer of the polymer composition according to the invention may also comprise a component (C) comprising at least one monomeric unit derived from an ethylenically unsaturated monomer (M3) carrying at least one functional group generating at least one of the following properties: bactericidal effect, printability, adhesion, sliding effect, anti-adhesion, thermochromic effect, anti-UV effect, antistatic effect, demisting effect, sealability or adsorption of gas.

The ethylenically unsaturated monomer (M3) advantageously has one of the following general structures $CH_2$=X"X', $CH_2$=CH—CO—OX", $CH_2$=C($CH_3$)—CO—O—X", X"—CO—O—CH=CH—CO—O—X', $CH_2$=C(O—CO—X")(CO—O—X') or $CH_2$=C(CO—O—X")($CH_2$—CO—O—X') in which X" and X' represent an identical or different functional group generating an identical or different desired property.

Component (C) of the co-oligomer (O1) advantageously comprises at least one monomeric unit derived from the monomer (M3). Preferably, the monomeric units derived from the monomer (M3) of component C represent at least 1% by weight of the co-oligomer (O1).

Advantageously, the monomeric units derived from the monomer (M3) of component (C) represent at most 50% by weight, preferably at most 25% by weight, and particularly preferably at most 15% by weight, of the co-oligomer.

Component (B) and component (C) of the co-oligomer (O1) may optionally be put together. In this case, the ethylenically unsaturated monomer generating a monomeric unit including component (B) and component (C) advantageously has one of the following general structures in which X" represents a functional group generating a desired property and represents a particular case of X being any group, as previously defined, and X' one of the groups defined in component (B) of the co-oligomer (O1):

$CH_2$=CX"X',   X"—O—CO—CH=CH—CO—O—X', X'—O—CO—CH=CH—CO—O—X", $CH_2$=C(CO—O—X")($CH_2$—CO—O—X'),   $CH_2$=C(CO—O—X')($CH_2$—CO—O—X"), $CH_2$=C(O—CO—X")(CO—O—X')   or   $CH_2$=C(O—CO—X')(CO—O—X").

Examples of ethylenically unsaturated monomers generating a monomeric unit including component (B) and component (C) would be, for example (X" representing the functional group generating the desired property and representing a particular case of X being any group, as previously defined a, b, c, d and e being as defined above):

$CH_2$=C($CH_2$—CO—O—$C_aH_{2a+1}$)(CO—O—X"),
$CH_2$=C($CH_2$—CO—O—X")(CO—O—$C_aH_{2a+1}$),
X"—O—CO—CH=CH—CO—O—$C_aH_{2a+1}$,
$CH_2$=C(O—CO—$C_aH_{2a+1}$)(CO—O—X"),
$CH_2$=C(O—CO—X")(CO—O—$C_aH_{2a+1}$),
X"—O—CO—CH=CH—CO—O—$(CH_2)_b$—$C_cF_{2c+1}$,
$CH_2$=C(O—CO—X")(CO—O—$(CH_2)_b$—$C_cF_{2c+1}$),
$CH_2$=C(CO—O—X")($CH_2$—CO—O—$(CH_2)_b$—$C_cF_{2c+1}$),
$CH_2$=C($CH_2$—CO—O—X")(CO—O—$(CH_2)_b$—$C_cF_{2c+1}$),
X"—O—CO—CH=CH—CO—O—$(CH_2)_d$—$(Si(CH_3)_2$—$O)_e$—$Si(CH_3)_3$,
$CH_2$=C(O—CO—X")(CO—O—$(CH_2)_d$—$(Si(CH_3)_2$—$O)_e$—$Si(CH_3)_3$),
$CH_2$=C(CO—O—X")($CH_2$—CO—O—$(CH_2)_d$—$(Si(CH_3)_2$—$O)_e$—$Si(CH_3)_3$),
$CH_2$=C($CH_2$—CO—O—X")(CO—O—$(CH_2)_d$—$(Si(CH_3)_2$—$O)_e$—$Si(CH_3)_3$),
HOOC—Y—O—CO—CH=CH—CO—O—X" with Y being $C_6H_4$ or $C_gH_{2g}$ in which g is between 1 and 15,
$CH_2$=C(O—CO—X")(CO—O—Y—COOH) with Y being $C_6H_4$ or $C_gH_{2g}$ in which g is between 1 and 15,
$CH_2$=C(O—CO—(Y—COOH))(CO—O—X") with Y being $C_6H_4$ or $C_gH_{2g}$ in which g is between 1 and 15,
X"—O—CO—CH=CH—CO—O—$C_hH_{2h}$-Z-$SO_3$H with h between 0 and 12, with Z being $C_6H_4$ or CR'R" with R' and R", which are the same or different, representing a hydrogen atom or an alkyl radical containing from 1 to 20 carbon atoms, X"—O—CO—CH=CH—CO—O(CH$_2$)$_i$—CR$_{10}$R$_{11}$—PO(OH)(OR$_1$) with R$_{10}$ and R$_{11}$, which are the same or different, being a hydrogen atom or an alkyl radical and i being between 1 and 20, CH$_2$=C(O—CO—X")(CO—O—(CH$_2$)$_i$—CR$_{10}$R$_{11}$—PO(OH)(OR$_1$)) with R$_{10}$ and R$_{11}$, which are the same or different, being a hydrogen atom or an alkyl radical and i being between 1 and 20, CH$_2$=C(CH$_2$—CO—O—X")(CO—O—(CH$_2$)$_i$—CR$_{10}$R$_{11}$—PO(OH)(OR$_1$)) with R$_{10}$ and R$_{11}$, which are the same or different, being a hydrogen atom or an alkyl radical and i being between 1 and 20, and CH$_2$=C(CO—O—X")(CH$_2$—CO—O—(CH$_2$)$_i$—CR$_{10}$R$_{11}$—PO(OH)(OR$_1$)) with R$_{11}$ and R$_{11}$, which are the same or different, being a hydrogen atom or an alkyl radical and i being between 1 and 20.

The co-oligomer (O1) preferably comprises a component (A) comprising at least one monomeric unit derived from vinylidene chloride and a component (B) comprising at least one monomeric unit (m2), derived from an ethylenically unsaturated monomer, carrying at least one group chosen from the groups —(CH$_2$)$_b$—C$_c$H$_{2c+1}$ with b between 1 and 11 and c greater than or equal to 5, and the phosphonate groups —PO(OH)(OR$_1$) with R$_1$ being a hydrogen atom or an alkyl radical containing from 1 to 11 carbon atoms, with the preferences defined above for b and c.

According to a first variant, the co-oligomer (O1) is preferably a co-oligomer of vinylidene chloride, of methyl acrylate and of 2-methacryloxy-ethylphosphonic acid (MAPHOS (OH)$_2$).

According to a second variant, the co-oligomer (O1) is preferably a co-oligomer of vinylidene chloride, of methyl acrylate and of 1H, 1H, 2K, 2H-heptadecafluorodecyl acrylate (FDA).

The co-oligomer (O1) involved in the composition according to the invention may be obtained by any process of radical polymerization, whether mass polymerization, polymerization in solution in a solvent or aqueous-dispersion polymerization, for obtaining the chain of monomeric units (random, alternating, block or gradient) and the structure (linear or branched) desired for the co-oligomer (O1).

Among the preferred polymerization processes are the polymerization processes during which the polymerization conditions (choice of temperature, nature of the initiator, use of a transfer agent) are such that the desired structure is obtained, and the processes of controlled radical polymerization.

The processes of controlled radical polymerization are particularly preferred. Among the processes of controlled radical polymerization, mention may be made of the ATRP (Atom Transfer Radical Polymerization) process, the RAFT (Reversible Addition-Fragmentation Chain Transfer) process, the MADIX (Macromolecular Design via Interchange of Xanthate) process, the NMP (Nitroxide Mediated Polymerization) process, the ITP (Iodine Transfer Polymerization) process and the RITP (Reverse Iodine Transfer Polymerization) process. The RAFT, ITP and RITP processes are particularly preferred.

The polymer composition according to the invention advantageously comprises at least 40% by weight, and preferably at least 50% by weight, of polymer (P1) relative to the total weight of the polymer (P1) and of the co-oligomer (O1).

The polymer composition according to the invention may also contain additives that are conventional for polymer compositions, such as dyes, stabilizers, processing aids, antiblocking agents, fillers, plasticizers or additives for improving fire resistance. The composition may also contain polymers such as the polymers mentioned as examples of polymers (P1), with a preference for halogenated polymers. Finally, the polymer composition according to the invention may or may not comprise a solvent or water.

Subsequently, a subject of the present invention is a process for preparing the polymer composition according to the invention.

To this effect, the invention relates to a process for preparing the polymer composition according to the invention, comprising the mixing of the polymer (P1) and of the co-oligomer(s) (O1) in at least one solvent, the dispersion of the co-oligomer(s) (O1) in an aqueous dispersion of the polymer (P1), or the mixing of the polymer (P1) and of the co-oligomer(s) (O1) by premixing.

When the polymer composition according to the invention is prepared by mixing the polymer (P1) and the co-oligomer(s) (O1) in at least one solvent, the concentration of the solution in the solvent(s) is advantageously between 1 and 100 g.l$^{-1}$, and preferably between 5 and 50 g.l$^{-1}$.

The expression "at least one solvent" is intended to denote that one or more solvents may be used.

Thus, when the polymer (P1) and the co-oligomer (O1) are not soluble in the same solvent, separate dissolution in an appropriate solvent for each of them can be carried out in a first step, followed by mixing of the two solutions.

When the polymer (P1) is a polymer of vinylidene chloride and the co-oligomer (O1) comprises at least one monomeric unit identical to that of vinylidene chloride, tetrahydrofuran, toluene, methyl ethyl ketone, acetone and mixtures thereof are preferred. When the co-oligomer (O1) carries at least one group —(CH$_2$)$_b$—C$_c$F$_{2c+1}$, trifluorotoluene may be used as co-solvent in order to facilitate the dissolving of the co-oligomer (O1).

When the polymer composition according to the invention is prepared by mixing the polymer (P1) and the co-oligomer(s) (O1) in at least one solvent, the polymer (P1) and the co-oligomer(s) (O1) are advantageously in the powder or liquid state.

The step of mixing the polymer (P1) and the co-oligomer(s) (O1) in at least one solvent may or may not be followed by a step of elimination of the solvent according to the use for which the mixture is intended. If the solvent is eliminated, this is preferably done by evaporation or by precipitation.

When the polymer composition according to the invention is prepared by dispersing the co-oligomer(s) (O1) in an aqueous dispersion of the polymer (P1), an aqueous dispersion of the polymer (P1) advantageously exhibiting a particle size of 50 to 500 nm, and preferably of 80 to 200 nm, is advantageously used. The aqueous dispersion of the polymer (P1) is preferably that obtained by means of the aqueous-emulsion polymerization process.

When the polymer composition according to the invention is prepared by dispersing the co-oligomer(s) (O1) in an aqueous dispersion of the polymer (P1), the co-oligomer(s) (O1) may be added in the powder or liquid state or in the form of an aqueous dispersion.

The step of dispersion of the polymer (P1) and of the co-oligomer(s) (O1) may or may not be followed by a step of elimination of the water according to the use for which the dispersion is intended. If the water is eliminated, this is preferably done by evaporation or by coagulation of the dispersion, followed by filter-drying and drying.

When the polymer composition according to the invention is prepared by mixing the polymer (P1) and the co-oligomer(s) (O1) by means of premixing the polymer (P1)

and the co-oligomer(s) (O1) are advantageously mixed in the powder or liquid state by dry process without melting.

The premixing may be followed by extrusion in order to produce granules in particular.

When, in the co-oligomer (O1), component (B) comprises at least one monomeric unit (m2) derived from an ethylenically unsaturated monomer (M2') carrying at least one group which, after cleavage, results in the group concerned, namely —COOH, —SO$_3$H or a phosphonate group —PO(OH)(OR$_1$) with R$_1$ being a hydrogen atom or an alkyl radical containing from 1 to 11 carbon atoms, the cleavage may be carried out prior to, during or subsequent to the step of preparation of the polymer composition as described above.

Preferably, the process for preparing the polymer composition according to the invention comprises the mixing of the polymer (P1) and of the co-oligomer(s) (O1) in at least one solvent.

In addition, a subject of the present invention is the use of the polymer composition according to the invention.

To this effect, the invention relates to the use of the polymer composition according to the invention, for coating metal, polymer, paper or cellophane surfaces, for producing thin single-layer or multilayer films or for producing moulded objects.

As metal surfaces, mention may be made of steel, galvanized steel and aluminum.

As polymer surfaces, mention may be made of polyethylene terephthalate, bioriented polypropylene, poly(vinyl chloride), polyethylene, polyamides and EVA (copolymer of ethylene and of vinyl acetate that is partially hydrolysed).

A subject of the present invention is also a process for coating metal, polymer, paper or cellophane surfaces by means of the polymer composition according to the invention.

To this effect, the invention relates to a process for coating metal, polymer, paper or cellophane surfaces by means of the polymer composition according to the invention, according to which the polymer composition is coated onto said surfaces, colaminated with said surfaces or coextruded with the material forming said surfaces.

When the polymer composition is coated onto said surfaces, a solution of said composition in at least one solvent or an aqueous dispersion of said composition is advantageously coated onto said surfaces by any conventional coating process or spray coating process or by immersion of the surface in the solution of the polymer composition. The coating step is preferably followed by a step of evaporation of the solvent or of the water, particularly preferably during a step of thermal treatment, most particularly preferably at a temperature greater than the glass transition temperature of the polymers and really very particularly preferably at a temperature greater than the melting temperature of the polymers.

When the polymer composition is colaminated with said surfaces, it is advantageously first extruded or coextruded in the form of a film and this film is then colaminated with said surfaces.

When the polymer composition is coextruded with the material forming said surfaces, said composition, in the form of a powder, is advantageously coextruded with the material forming said surfaces, in the form of a powder or of granules, so as to obtain said surfaces coated with the polymer composition in the form of films, of sheets or of plates.

When, in the co-oligomer (O1), component (B) comprises at least one monomeric unit (m2) derived from an ethylenically unsaturated monomer (M2') carrying at least one group which, after cleavage, results in the group concerned, namely —COOH, —SO$_3$H or a phosphonate group —PO(OH)(OR$_1$) with R$_1$ being a hydrogen atom or an alkyl radical containing from 1 to 11 carbon atoms, the cleavage may be carried out just before or during the operation to coat the metal, polymer, paper or cellophane surfaces with the polymer composition.

Finally, a subject of the invention is the articles or parts of articles prepared by means of the polymer composition according to the invention.

The articles or parts of articles are advantageously films, sheets, plates, thin single-layer or multilayer films or moulded objects.

The thin single-layer or multilayer films obtained may be used, for example, in packaging.

The moulded objects obtained may, for example, be obtained by injection or by injection-blowing.

The polymer composition according to the invention has many advantages. Thus, the polymer composition according to the invention makes it possible to improve the adhesion of a polymer coating to a metal, polymer, paper or cellophane surface. It thus makes it possible to avoid the use of primer or of adhesive between the layers of a multilayer assembly. Finally, it makes it possible to modify the properties of the coating that it forms and to improve the surface properties, such as the anti-corrosion properties, the gas-barrier properties, the antibacterial properties, the adhesion of inks at the surface and the protection against ultraviolet rays.

The examples which follow are intended to illustrate the invention without, however, limiting the scope thereof.

Scanning Electron Microscopy (SEM)

Scanning electron microscopy was used to visualize the morphology of the coating after deposition of the polymer compositions onto a steel surface and the location of the phosphorus. A Hitachi scanning electron microscope was used. This made it possible to perform a fine analysis of the morphology of the coating and to differentiate the heavy elements with respect to the light elements by chemical contrast; the appearance of the heavy elements being lighter in colour.

X-Ray-Coupled Scanning Electron Microscopy (SEM-EDX)

Scanning electron microscopy was used to visualize the morphology of the coating and the location of the phosphorus. A LEICA X-ray-coupled scanning electron microscope was used. This gave less resolution than the SEM microscope but made it possible to characterize the elements constituting the coating. It involves spectrometry using X-rays induced under the effect of an electron beam. The spectra obtained made it possible to identify all the elements present in the coating, subjected to the stream of electrons. For this, a beam of electrons was projected onto the surface to be analysed and the X-photons emitted were detected. By means of the energy released by the bombarded elements, an X-rays spectrum was obtained. Two types of analyses could be carried out. Either an overall analysis of the image visualized on the screen was carried out, which gave a mean of the composition of the coating, or a probe was used which made it possible to sight and analyse surfaces with an accuracy of 1 µm$^3$. The accuracy of the probe made it possible to study the location of the various chemical elements within the section of the coating, by sighting with the microscope probe at various places.

Sample Analyses by SEM and SEM-EDX

Analyses were carried out at the surface, at the interface and within the section of the coating by SEM microscopy and by SEM-EDX microscopy. Before any analysis, the samples were subjected to three successive metallizations with carbon for Examples 5-8 and to a metallization with platinum for Example 10. In order to carry out peak height comparisons, the same magnification, the same beam acceleration voltage (7 KV) and the same number of "hits" (electron bombardments) were used.

In order to be able to analyse the section of the coating, the sample was immersed in liquid nitrogen and the metal support was bent in order to cause a cryofracture within the coating, and then the latter was detached using a scalpel. Initially, surface analyses (view from above), followed by interface analyses (view from below), were carried out on the zones having been detached. Finally, the section was characterized by means of successive sightings with the microscope probe.

EXAMPLE 1 (ACCORDING TO THE INVENTION)

Preparation of a Vinylidene Chloride Polymer 1400 g of demineralized water were introduced into a 3 liter autoclave with mechanical stirring at 350 rpm. A solution of azobisisobutyronitrile (AIBN) in a dispersing agent of the cellulose derivative type (methylhydroxypropylcellulose), prepared by adding 1.85 g of AIBN ($1.13 \times 10^{-2}$ mol) to 192 ml of a solution of the dispersing agent at 10.4 g.l$^{-1}$, was then introduced into the autoclave. The reactor was then purged with vacuum-nitrogen cycles. A solution of vinylidene chloride (818 g, 8.44 mol) and methyl acrylate (181 g, 2.10 mol) was then introduced into the autoclave. The temperature was maintained at 70° C. for 18 hours. Before the reactor was opened, the residual monomers were eliminated by degassing under vacuum for one hour.

A polymer was recovered which was then dried under a fluidized bed. It was characterized by a number-average molar mass $\overline{M}_n$ of 63 000 g.mol$^{-1}$ and a polydispersity index $I_p$ (ratio of the weight-average molar mass to the number-average molar mass) of 1.99. The number-average molar mass $\overline{M}_n$ and the polymolecularity index $I_p$ were determined by steric exclusion chromatography on the dry samples with a system having a Waters pump equipped with two 300 mm PL-Gel 5 μm mixed-C columns (Polymer Laboratories). Tetrahydrofuran (1 ml.mn$^{-1}$) was used as eluent. The calibrations were carried out using standard polystyrene from Polymer Laboratories.

The mass yield was 92%. The glass transition temperature of the vinylidene chloride polymer obtained, measured on a Pyris 1 DSC device from Perldn Elmer, is 32° C. The polymer obtained is characterized by a vinylidene chloride content of 80 mol % (82% by weight) and a methyl acrylate content of 20 mol % (18% by weight).

EXAMPLE 2 (COMPARATIVE)

Preparation of a Vinylidene Chloride Co-Oligomer not Carrying a Group According to the Invention The copolymerization was carried out in a stainless steel type 316 autoclave with a working volume of 300 ml (Parr instrument), and a test pressure of 338 bar, i.e. a maximum service pressure of 225 bar and a maximum service temperature of 200° C. The autoclave was equipped with a shaft and a propeller with 4 angled blades, entrained by magnetic stirring at a variable rate of 0 to 1700 rpm (torque 180 N.cm).

Before introducing the reaction mixture, the autoclave was placed under vacuum. A solution containing vinylidene chloride (65.8 g, $6.68 \times 10^{-1}$ mol), methyl acrylate (14.9 g, $1.67 \times 10^{-1}$ mol), AIBN (0.155 g, $8.81 \times 10^{-4}$ mol), 1-(ethoxycarbonyl)eth-1-yl dithiobenzoate (1.34 g, $5.28 \times 10^{-3}$ mol) and benzene (96.9 g, 1.24 mol) was introduced into the reactor.

The reaction mixture was brought to 70° C. under a nitrogen atmosphere while maintaining the rate of stirring at 400 rpm for 18 hours.

The overall conversion was determined by gravimetry according to the following procedure. A sample of approximately 2 g was taken in a haemolysis tube before being cooled using liquid nitrogen. The solvent and the residual monomers were evaporated off under vacuum at 35° C., after having added hydroquinone. The conversion was calculated according to the equation: $(m_{dry} \times 100)/(m_{sample} \times SC)$ with $m_{dry}$ being the mass of the sample after evaporation, $m_{sample}$ being the mass of the crude sample and SC being the theoretical solids content at 100% conversion. The conversion by mass of the final sample was 55.6%. The co-oligomer obtained was solubilized in tetrahydrofuran and precipitated twice from pentane in order to purify it.

The number-average molar mass $\overline{M}_n$, determined by steric exclusion chromatography as explained above, of the co-oligomer obtained was 6800 g.mol$^{-1}$ and the polydispersity index $I_p$ was 1.36. The glass transition temperature of the co-oligomer, determined by DSC, was 29.5° C. The polymer obtained is characterized by a vinylidene chloride content of 80 mol % (82% by weight) and a methyl acrylate content of 20 mol % (18% by weight).

EXAMPLE 3 (COMPARATIVE)

Preparation of a Vinylidene Chloride Co-Oligomer Carrying —P(O)(OCH$_3$)$_2$ Functions In the same autoclave as that used in Example 2, a solution containing vinylidene chloride (21.37 g, $2.21 \times 10^{-1}$ mol), methyl acrylate (3.51 g, $4.08 \times 10^{-2}$ mol), dimethyl 2-methacryloxyethylphosphonate (MAPHOS(OCH$_3$)$_2$) (3 g, $1.36 \times 10^{-2}$ mol), AIBN (47.8 mg, $2.91 \times 10^{-4}$ mol), 1-(ethyloxycarbonyl)eth-1-yl dithiobenzoate (0.35 g, $1.39 \times 10^{-3}$ mol) and benzene (34.21 g, $4.39 \times 10^{-1}$ mol) was introduced into the reactor.

The reaction mixture was brought to 70° C. while maintaining the rate of stirring at 400 rpm for 24 hours. The co-oligomer obtained was solubilized in tetrahydrofuran and precipitated twice from pentane in order to purify it.

The overall conversion, determined by gravimetry as defined in Example 2, was 32.5%.

The number-average molar mass $\overline{M}_n$, determined by steric exclusion chromatography as explained above, of the co-oligomer obtained was 5800 g.mol$^{-1}$ and the polydispersity index $I_p$ was 1.53. The glass transition temperature of the co-oligomer, determined by DSC, was 21.6° C. The co-oligomer obtained is characterized by a vinylidene chloride content of 75 mol % (66.6% by weight), a methyl acrylate content of 14 mol % (11% by weight) and a MAPHOS (OCH$_3$)$_2$ content of 11 mol % (22.4% by weight).

The incorporation of the MAPHOS(OCH$_3$)$_2$ monomer into the co-oligomer was confirmed by a $^{31}$P NMR analysis on a Bruker 200 MHz device in D$_8$-tetrahydrofuran, which showed a single peak at 29.8 ppm, a shift identical to that of MAPHOS(OCH$_3$)$_2$, and by elemental analysis, which gave a percentage of phosphorus in the precipitated co-oligomer of 2.7%, for 1.54% theoretically. The presence of an amount of phosphorus greater than the theoretical value confirms that the co-oligomer obtained is a copolymer with a MAPHOS (OCH$_3$)$_2$ distribution gradient.

EXAMPLE 4 (ACCORDING TO THE INVENTION)

Preparation of a Vinylidene Chloride Co-Oligomer Carrying —P(O)(OH)$_2$ Functions The co-oligomer prepared in Example 3 (5 g, $8.58 \times 10^{-4}$ mol) was introduced into a two-necked round-bottomed flask equipped with a refrigerant and a skirted stopper, and was dissolved in 25 ml of dichloromethane. After sweeping with argon for 30 minutes, bromotrimethylsilane (1.07 g, 6.97× $10^{-3}$ mol) was introduced dropwise. The reaction mixture was left at ambient temperature for 96 hours, with magnetic sting, under an inert atmosphere. The reaction was followed by $^{31}P$ NMR This reaction time was necessary in order to cleave all the phosphonic ester functions distributed on the co-oligomer chain. When the silylation was complete, the solvent was evaporated off under vacuum 25 ml of methanol were subsequently added and the mixture was left for 2 hours with stirring. After elimination of the methanol under a strong vacuum the diacid co-oligomer was collected in the form of a solid. The glass transition temperature of the diacid co-oligomer is 48° C.

The incorporation of the monomer MAPHOS(OH)$_2$ into the co-oligomer was confirmed by $^{31}p$ NMR analysis on a Bruker 200 MHz device in $D_8$-tetrahydrofuran which showed a single peak at 27.4 ppm, the chemical shift of MAPHOS (OH$_2$, and by elemental analysis, which gave a percentage of phosphorus in the precipitated co-oligomer of 3.1% for 1.56% theoretically. The presence of an amount of phosphorus greater than the theoretical value confirms that the co-oligomer obtained is a MAPHOS(OH)$_2$ distribution gradient copolymer.

EXAMPLE 5 (COMPARATIVE)

Preparation of a Polymer Composition Containing a Vinylidene Chloride Polymer and a Vinylidene Chloride Co-Oligomer not Carrying a Group According to the Invention and its use for Coating a Metal Surface A polymer composition containing the vinylidene chloride polymer prepared in Example 1 and the vinylidene chloride co-oligomer prepared in Example 2, in a 50/50 mass ratio, was prepared by dissolving them in tetrahydrofuran (concentration 2 g.l$^{-1}$).

This composition was deposited by spincoating onto a 1 cm$^2$ steel surf-ace. This support was cleaned and degreased beforehand by successive washing with acetone and with ether, and then carefully dried under vacuum.

Thus, a drop of a solution containing 2 g.l$^{-1}$ of the composition in tetrahydrofuran was deposited on the surface to be coated and the platform was spun (spin coating) for 30 seconds at 2000 rpm. The thickness of the coating was uniform and determined by the dilution and by the platform rotation rate and time.

After the deposition, curing was again performed above the glass transition temperature of the polymers in a ventilated oven at 70° C. for 4 hours. The re-curing temperature was intentionally chosen above the glass transition temperature of the polymers in order to allow reorganization of the polymer chains in the coating. This re-curing also made it possible to eliminate the residual solvent.

Figure 1:
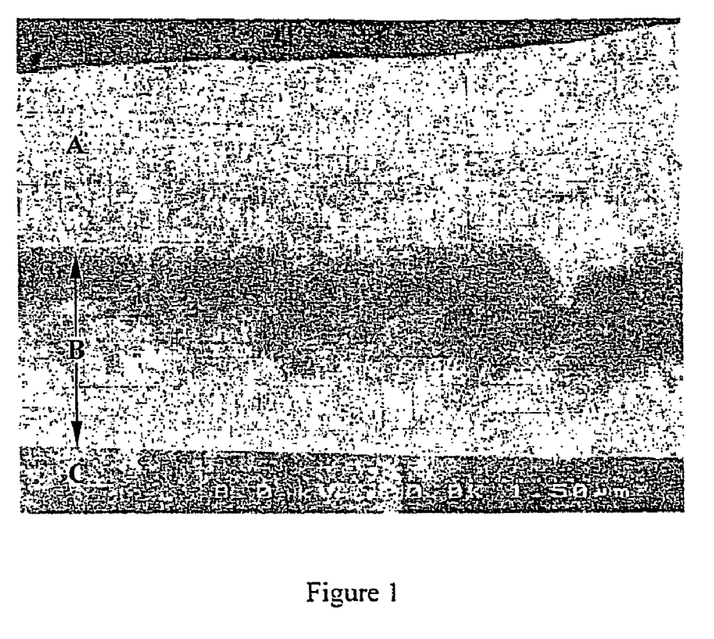

Analyses of the SEM-EDX spectra for the coating made up of the composition according to Example 5 showed the presence of the three constituent elements. Thus, the carbon line was distinguished at 0.2 KeV (K$_\alpha$), the oxygen line at 0.05 KeV (K$_\alpha$) and the 2 chlorine lines at 2.6 (K$_\alpha$) and 2.8 KeV (K$_\beta$). The same composition was found at the surface and the interface of the coating. This result was confirmed by means of the photograph taken with the SEM microscope, represented in FIG. 1 (SEM photograph of the section of the coating made up of the polymer composition according to Example 5, on which A represents the interface, B, represents the section and C represents the surface, at a magnification of 20 000×), which shows a completely uniform deposition. It should be noted that the coating made up of the polymer composition according to Example 5 exhibited very little resistance when it was tom away from the support (therefore weak adhesion).

EXAMPLE 6 (COMPARATIVE)

Preparation of a Polymer Composition Containing a Vinylidene Chloride Polymer and a Vinylidene Chloride Co-Oligomer Carrying —P(O)(OCH$_3$)$_2$ Functions and its use for Coating a Metal Surface A polymer composition conning the vinylidene chloride polymer prepared in Example 1 and the vinylidene chloride co-oligomer prepared in Example 3, in a 50/50 mass ratio, was prepared in the same way as in Example 5.

Deposition onto a steel surface was carried out according to the same procedure as that described in Example 5.

The SEM-EDX analyses of the coating made up of the polymer composition according to Example 6 revealed the presence of the phosphorus X-line at 2 KeV (K$_\alpha$) at the surface and at the interface. In order to be able to compare the respective amounts of phosphorus present at the various places on the coating, EDX spectra were superimposed, talking a reference peak, either oxygen or chlorine. In order for these results to be quantitative, the analyses were carried out at the same magnification (×1000) and at the same strength (7 KeV). The EDX spectra showed a slight migration of the phosphorus towards the metal interface.

Figure 2:
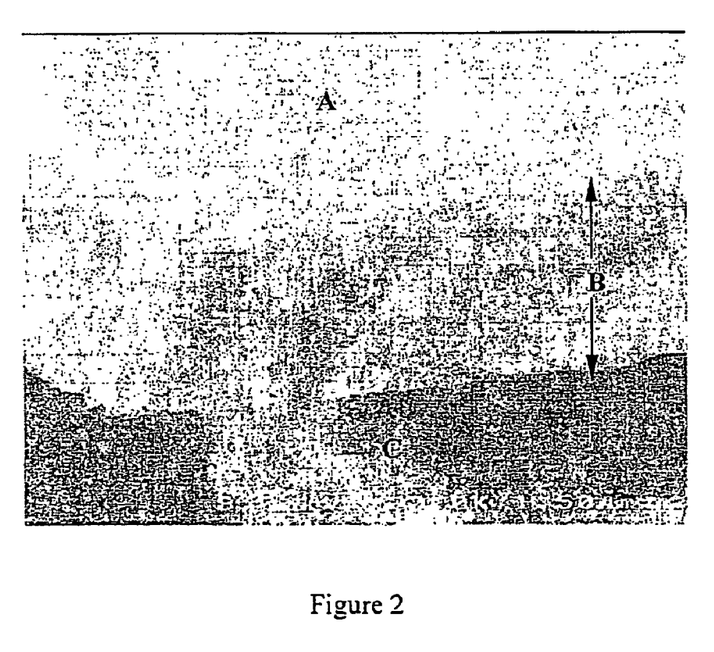

The photograph taken with the SEM microscope, represented in FIG. 2 (SEM photograph of the section of the coating made up of the polymer composition according to Example 6, on which A represents the interface, B represents the section and C represents the surface, at a magnification of 20 000×), showed that the coating was uniform. Thus, the incorporation of the MAPHOS(OCH$_3$)$_2$ monomer did not disturb the morphology of the deposit.

EXAMPLE 7 (ACCORDING TO THE INVENTION)

Preparation of a Polymer Composition Containing a Vinylidene Chloride Polymer and a Vinylidene Chloride Co-Oligomer Carrying —P(O)(OH)$_2$ Functions and its use for Coating a Metal Surface A polymer composition containing the vinylidene chloride polymer prepared in Example 1 and the vinylidene chloride co-oligomer prepared in Example 4, in a 50/50 mass ratio, was prepared in the same way as in Example 5.

The deposition onto a steel surface was carried out according to the same procedure as that described in Example 5.

The surface EDX analyses of this coating did not show the presence of phosphorus, this being the case in all the zones analysed, with more or less high magnification. On the other hand, in the analyses at the interface, it was possible to note the presence of phosphorus. The presence of iron (line at 0.8 KeV) was also observed. This is the result of the strong adhesion of the coating to the support, which coating was more difficult to tear away than in the case of the compositions according to Examples 5 and 6. Specifically, when the film was detached, a fine layer of the metal support was torn away.

Figure 3:
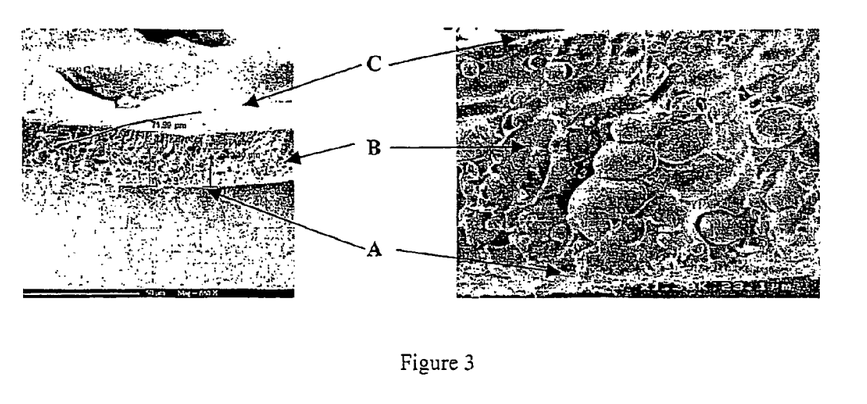
Figure 4:
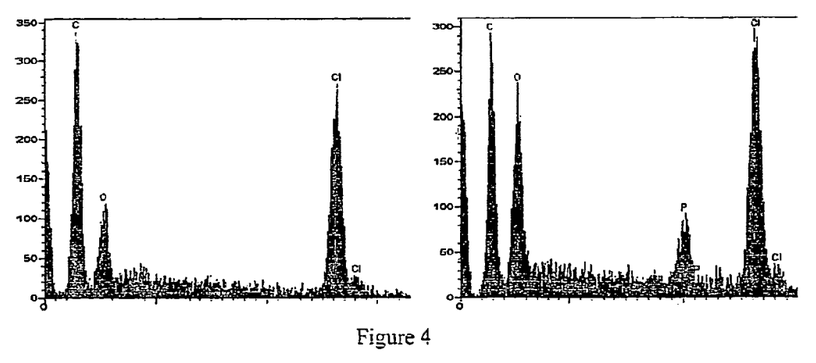

The section of the coating was then characterized. It was possible to note that it was made up of many nodules within a continuous matrix, as represented in FIG. 3, which represents, on the left, a photograph obtained by means of the SEM-EDX microscope in secondary electron mode (magnification 860×) and, on the right, a photograph obtained by means of the SEM microscope (magnification 1300×), of the section of the coating made up of the polymer composition according to Example 7 (A is the interface, B is the section and C is the surf-ace). The size of these nodules was not consistent and ranged from 6 to 15 μm. By sighting with the microscope probe on a nodule, an intense peak of phosphorus was revealed in the SEM-EDX spectrum, whereas by sighting on the matrix, this peak was not revealed, as illustrated in FIG. 4 representing the SEM-EDX spectra obtained using the probe sighting in the matrix (on the left) or in the nodules (on the right). Mapping of the phosphorus composition of the same zone confirmed the fact that the phosphorus was found exclusively in the nodules.

In addition, on the photo in FIG. 3, on the left, it is possible to see a zone depleted of nodules towards the surface of the coating which is 20 μm thick. This explains the surface SEM-EDX analyses which did not reveal any phosphorus on the spectra On the other hand, there are more nodules (thickness 50 μm) close to the metal interface, which confirms the presence of phosphorus on the spectra performed at the interface.

Finally, it could be noted, by means of the SEM-EDX microscopy, that, at certain places on the metal plate, a fine film of coating remains after said coating had been torn off. These results showed that, when the coating was torn off, some nodules remained on the metal surface; this is proof that the acid phosphonate groups present in the co-oligomer are playing their role of adhesion promoter.

EXAMPLE 8 (ACCORDING TO THE INVENTION)

Preparation of a Polymer Composition Containing a Vinylidene Chloride Polymer and a Vinylidene Chloride Co-Oligomer Carrying —P(O)(OH)$_2$ Functions and its use for Coating a Metal Surface A polymer composition containing the vinylidene chloride polymer prepared in Example 1 and the vinylidene chloride co-oligomer prepared in Example 4, in a 90/10 mass ratio, was prepared in the same way as in Example 5.

The deposition onto a steel surface was carried out according to the same procedure as that described in Example 5.

Figure 5:
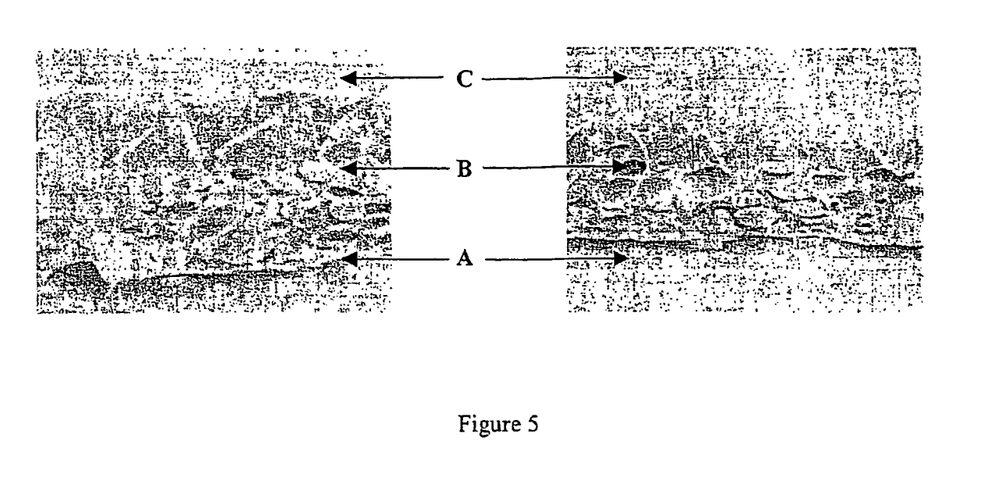

The SEM-EDX analyses of the coating made up of the polymer composition according to Example 8 gave results comparable to those obtained for the coating made up of the composition according to Example 7. The phosphorous was detected only on the spectra realised at the interface and in the nodules. In addition, the photos produced by SEM as represented in FIG. 5, on the left at a magnification of 860× and, on the right at a magnification of 1300× (A is the interface, B is the section and C is the surface), showed a greater concentration of nodules towards the metal interface. They also showed that a wider zone than in the case of Example 7, and representing approximately half the thickness of the deposit, consists only of the polymer. Finally, the amount of visible nodules within the coating was completely in agreement with the proportion of co-oligomer in the composition.

EXAMPLE 9 (ACCORDING TO THE INVENTION)

Preparation of a Vinylidene Chloride Co-Oligomer Carrying —(CH$_2$)$_b$—C$_c$F$_{c+1}$ Functions A solution of 1H, 1H, 2H, 2H-heptadecafluorodecyl acrylate (FDA) (5 g, 9.65×10$^{-3}$ mol), AIBN (0.0111 g, 6.75×10$^{-5}$ mol) and the vinylidene chloride co-oligomer prepared in Example 2 (1.133 g, 1.67×10$^{-4}$ mol) in benzene (24.57 g, 3.15×10$^{-1}$ mol) was placed in a 50 ml two-necked round-bottomed flask. The oxygen was eliminated by means of freeze-thawing cycles under vacuum in order to eliminate the air and then by bubbling nitrogen. The solution was brought to 70° C. with magnetic stirring for 22 hours. The final co-oligomer, consisting of 2 blocks, a first block which is a co-oligomer of vinylidene chloride and of methyl acrylate and a second block which is an FDA homooligomer, was precipitated from pentane and dried under vacuum 2.95 g of said co-oligomer was recovered, i.e. a yield by mass of 36.3%.

The elemental analysis of the co-oligomer obtained gave the following percentages: 30.37% of C, 39.47% of F and 19.53% of Cl, making it possible to calculate a molar composition of 59% of vinylidene chloride, 15% of methyl acrylate and 26% of FDA, and a composition by mass of 28% of vinylidene chloride, 6.3% of methyl acrylate and 65.7% of FDA. A number-average molar mass of 19 800 g.mol$^{-1}$ was calculated on the basis of these values and by assuming that all the FDA is in diblock form.

Moreover, a theoretical average molar mass of 17 700 g.mol$^{-1}$ was calculated on the basis of the yield by mass.

EXAMPLE 10 (ACCORDING TO THE INVENTION)

Preparation of a Polymer Composition Containing a Vinylidene Chloride Polymer and a Vinylidene Chloride Co-Oligomer carrying —(CH$_2$)$_b$—C$_c$F$_{2c+1}$ Functions and its use for Coating a Metal Surface A polymer composition containing the vinylidene chloride polymer prepared in Example 1 and the vinylidene chloride co-oligomer prepared in Example 9, in an 80/20 mass ratio, was prepared by dissolving them in tetrahydrofuran (concentration 2 g.l$^{-1}$).

This composition was deposited by bare-coating onto a 1 cm$^2$ steel surface. This support was cleaned and degreased beforehand by successive washing with acetone and with ether and was then carefully dried under vacuum.

Thus, a drop of a solution containing 2 g/l of the composition in tetrahydrofuran was deposited onto the surface to be coated. The drop was then spread out using a bar and the solvent slowly evaporated off. The thickness of the coating was determined by virtue of the space between the steel surface and the bar and also by virtue of the concentration of the solution.

After the deposition, curing was again performed above the glass transition temperature of the vinylidene chloride polymer and of that of the co-oligomer and also above the melting temperature of the PFBA block of the co-oligomer (71° C.) in a ventilated oven at 100° C. for 7 hours. The re-curing temperature was intentionally chosen above the glass transition temperature of the polymers and the melting temperature of the PFBA, so as to allow reorganization of the polymer chains in the coating. This re-curing also made it possible to eliminate the residual solvent.

The SEM photograph of the surface of the coating shows that said surface is not even, but has nodules. The SEM photograph of the interface of the coating indicates, for its part, that the nodules are virtually absent from this zone.

Figure 6:
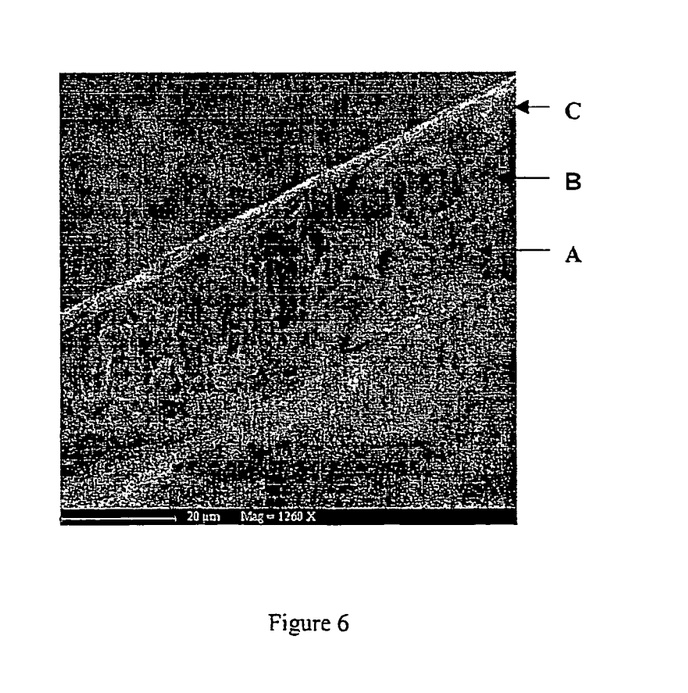

Finally, the SEM photograph of the section of the coating made up of the polymer composition according to Example 10 (A represents a sighting within the section, close to the interface, B represents a sighting at the heart of the section and C represents a sighting within the section, close to the surface), at a magnification of 1260× represented in FIG. 6, and the SEM-EDX analyses (FIG. 7) at the surface (C), at the interface (A) and in the heart of the section of the coating (B), illustrate the presence of the fluorinated co-oligomer within the section of the coating.

Figure 7:
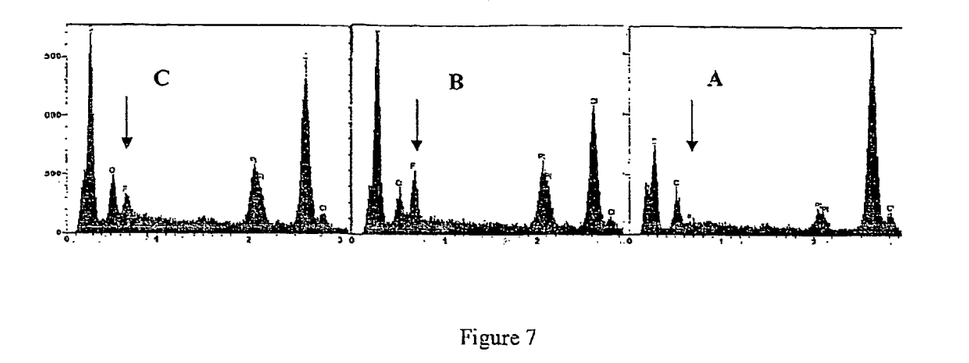

FIG. 7 in fact illustrates the EDX spectra obtained (on the left, at the surface (C), at the center, in the heart of the section (B) and, on the right, at the interface (A) of the coating). It can be seen there that the fluorine is present only in the heart of the section and at the surface of the coating and not at the interface.

The invention claimed is:

1. A polymer composition comprising
   1) a polymer (P1) comprising at least 50% by weight of monomeric units derived from an ethylenically unsaturated monomer (M1), and
   2) at least one co-oligomer (O1) comprising at least:
      a) a component (A) comprising at least one monomeric unit identical to that derived from the monomer (M1) on which the polymer (P1) is based, and
      b) a component (B) comprising at least one monomeric unit (m2), derived from an ethylenically unsaturated monomer, carrying at least one phosphonate group —PO(OH)(OR$_1$) with R$_1$ being a hydrogen atom or an alkyl radical containing from 1 to 11 carbon atoms,
   wherein the number-average molar mass of polymer (P1) is greater than 30,000 and the number-average molar mass of co-oligomer (O1) is less than or equal to 30,000.

2. The composition according to claim 1, wherein the polymer (P1) is a chlorinated polymer.

3. The composition according to claim 1, wherein in the polymer (P1) ethylenically unsaturated monomer (M1) is vinylidene chloride, which is present in an amount of 70 to 95% by weight.

4. A process for preparing a composition according to claim 1, comprising the mixing of the polymer (P1) and of the co-oligomer(s) (O1) in at least one solvent, the dispersion of the co-oligomer(s) (O1) in an aqueous dispersion of the polymer (P1), or the mixing of the polymer (P1) and of the co-oligomer(s) (O1) by premixing.

5. A process for coating metal, polymer, paper or cellophane surfaces with the polymer composition according to claim 1, according to which the polymer composition is coated onto said surface, colaminated with said surface or coextruded with the material forming said surface.

6. An article or part of an article comprising the polymer composition according to claim 1.

7. A method for producing a single-layer or multi-layer film comprising forming the film with the composition according to claim 1.

8. The composition according to claim 1, wherein the number-average molar mass of polymer (P1) is less than or equal to 2,000,000 and the number-average molar mass of co-oligomer (O1) is less than or equal to 25,000.

9. The composition according to claim 1, wherein the at least one monomeric unit (m2), derived from an ethylenically unsaturated monomer, carrying at least one phosphonate group —PO(OH)(OR$_1$) with R$_1$ being a hydrogen atom or an alkyl radical containing from 1 to 11 carbon atoms is selected from the group consisting of:

$CH_2$=$CR_9$—CO—O—$(CH_2)_i$—PO(OH)(OR$_1$) with R$_9$ being a hydrogen atom or a methyl radical and i being between 1 and 20, $CH_2$=$CR_9$—CO—O—$CR_{10}R_{11}$—PO(OH)(OR$_1$) with R$_9$ being a hydrogen atom or a methyl radical and R$_{10}$ and R$_{11}$, which are the same or different, being a hydrogen atom or an alkyl radical containing from 1 to 11 carbon atoms, $CH_2$=$CR_9$—CO—O—$CH_2$—CH(OH)—$CH_2$—PO(OH)(OR$_1$) with R$_9$ being a hydrogen atom or a methyl radical, $CH_2$=$CR_9$—CO—O—$CH_2$—CH(OH)—$CH_2$—CO—O—$(CH_2)_2$—PO(OH)(OR$_1$) with R$_9$ being a hydrogen atom or a methyl radical, $CH_2$=$CR_9$—CO—O—$CH_2$—$CH_2$—NH—CO—O—$(CH_2)_i$—PO(OH)(OR$_1$) with R$_9$ being a hydrogen atom or a methyl radical and i being between 1 and 20, $CH_2$=$CR_9$—CO—O—$CH_2$—$CH_2$—NH—CO—O-$CR_{10}R_{11}$—PO(OH)(OR$_1$) with R$_9$ being a hydrogen atom or a methyl radical and R$_{10}$ and R$_{11}$, which are the same or different, being a hydrogen atom or an alkyl radical containing from 1 to 11 carbon atoms, $CH_2$=$C(CH_3)$—$C_6H_4$—$C(CH_3)_2$—NH—CO—O—$(CH_2)_i$—PO(OH)(OR$_1$) with i between 1 and 20, $CH_2$=$C(CH_3)$—$C_6H_4$—$C(CH_3)_2$—NH—CO—O—$CR_{10}R_{11}$—PO(OH)(OR$_1$) with R$_{10}$ and R$_{11}$, which are the same or different, being a hydrogen atom or an alkyl radical containing from 1 to 11 carbon atoms and the substitution of the aromatic ring being in the meta-position, $CH_2$=CH—$C_6H_4$—$CH_2$—PO(OH)(OR$_1$) with the substitution of the aromatic ring being a mixture of ortho- and para-substitution, $CH_2$=CH—PO(OH)(OR$_1$), and the corresponding monomers carrying at least one group —PO(OR$_{1'}$)(OR$_{2'}$) with R$_{1'}$ and R$_{2'}$, which are the same or different, representing an alkyl radical containing from 1 to 11 carbon atoms which, after total cleavage or partial cleavage, results in the phosphonate group —PO(OH)(OR$_1$), and mixtures thereof.

10. The composition according to claim 1, wherein the at least one monomeric unit (m2), derived from an ethylenically unsaturated monomer, carrying at least one phosphonate group —PO(OH)(OR$_1$) with R$_1$ being a hydrogen atom or an alkyl radical containing from 1 to 11 carbon atoms is selected from the group consisting of:

$CH_2$=$CR_9$—CO—O—$(CH_2)_i$—PO(OH)(OR$_1$) with R$_9$ being a hydrogen atom or a methyl radical and i being between 1 and 20, $CH_2$=$CR_9$—CO—O—$CH_2$—$CH_2$—NH—CO—O—$(CH_2)_i$—PO(OH)(OR$_1$) with R$_9$ being a hydrogen atom or a methyl radical and i being between 1 and 20, $CH_2$=CH—PO(OH)(OR$_1$), and the corresponding monomers carrying at least one group —PO(OR$_{1'}$)(OR$_{2'}$) with R$_{1'}$ and R$_{2'}$, which are the same or different, representing an alkyl radical containing from 1 to 11 carbon atoms which, after total cleavage or partial cleavage, results in the phosphonate group —PO(OH)(OR$_1$), and mixtures thereof.

11. A polymer composition comprising
   1) a polymer (P1) comprising at least 50% by weight of monomeric units derived from an ethylenically unsaturated monomer (M1), and
   2) at least one co-oligomer (O1) comprising at least:
      a) a component (A) comprising at least one monomeric unit identical to that derived from the monomer (M1) on which the polymer (P1) is based, and
      b) a component (B) comprising at least one monomeric unit (m2), derived from an ethylenically unsaturated monomer, carrying at least one —$(CH_2)_b$—$C_cF_{2c+1}$ group with b between 1 and 11 and c greater than or equal to 5, wherein the number-average molar mass of polymer (P1) is greater than 30,000 and the number-average molar mass of co-oligomer (O1) is less than or equal to 30,000, and wherein the at least one monomeric unit (m2), derived from an ethylenically unsaturated monomer, carrying at least one —$(CH_2)_b$—$C_cF_{2c+1}$ group with b between 1 and 11 and c greater than or equal to 5 is selected from the group consisting of:

$CH_2$=$CH$—$CO$—$O$—$(CH_2)_b$—$C_cF_{2c+1}$,
$CH_2$=$C(CH_3)$—$CO$—$O$—$(CH_2)_b$—$C_cF_{2c+1}$,
$CH_2$=$CH$—$CO$—$O$—$(CH_2)_f$—$NR_8$—$SO_2$—$(CH_2)_b$—$C_cF_{2c+1}$, with $R_8$ being a hydrogen atom or a radical —$CH_3$ and f being between 1 and 15,
$CH_2$=$CH$—$C_6H_4$—$CH_2$—$O$—$(CH_2)_b$—$C_cF_{2c+1}$,
$CH_2$=$CH$—$O$—$CO$—$(CH_2)_b$—$C_cF_{2c+1}$, and mixtures thereof.

12. The composition according to claim 11, wherein the polymer (P1) is a chlorinated polymer.

13. The composition according to claim 11, wherein in the polymer (P1) ethylenically unsaturated monomer (M1) is vinylidene chloride, which is present in an amount of 70 to 95% by weight.

14. A process for preparing a composition according to claim 11, comprising the mixing of the polymer (P1) and of the co-oligomer(s) (O1) in at least one solvent, the dispersion of the co-oligomer(s) (O1) in an aqueous dispersion of the polymer (P1), or the mixing of the polymer (P1) and of the co-oligomer(s) (O1) by premixing.

15. A process for coating metal, polymer, paper or cellophane surfaces with the polymer composition according to claim 11, according to which the polymer composition is coated onto said surfaces, colaminated with said surface or coextruded with the material forming said surface.

16. An article or part of an article comprising the polyer composition according to claim 11.

17. A method for producing a single-layer or multi-layer film comprising forming the film with the composition according to claim 11.

18. The composition according to claim 11, wherein the number-average molar mass of polymer (P1) is less than or equal to 2,000,000 and the number-average molar mass of co-oligomer (O1) is less than or equal to 25,000.

19. The composition according to claim 11, wherein the at least one monomeric unit (m2), derived from an ethylenically unsaturated monomer, carrying at least one —$(CH_2)_b$—$C_cF_{2c+1}$ group with b between 1 and 11 and c greater than or equal to 5 is selected from the group consisting of:

$CH_2$=$CH$—$CO$—$O$—$(CH_2)_b$—$C_cF_{2c+1}$, and
$CH_2$=$C(CH_3)$—$CO$—$O$—$(CH_2)_b$—$C_cF_{2c+1}$, and mixtures thereof.

\* \* \* \* \*